(12) United States Patent
Du et al.

(10) Patent No.: US 11,953,633 B1
(45) Date of Patent: Apr. 9, 2024

(54) METHOD, DEVICE AND COMPUTER DEVICE FOR DECOUPLING ANISOTROPIC ELASTIC WAVE

(71) Applicant: China University of Petroleum (East China), Qingdao (CN)

(72) Inventors: Qizhen Du, Shandong Province (CN); Shihao Zhou, Shandong Province (CN); Zhaoshun Liu, Shandong Province (CN); Wenhao Lyu, Shandong Province (CN); Li-Yun Fu, Shandong Province (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/492,896

(22) Filed: Oct. 24, 2023

(30) Foreign Application Priority Data

Oct. 24, 2022 (CN) .......................... 202211301926.5

(51) Int. Cl.
*G01V 1/00* (2006.01)
*G01V 1/28* (2006.01)

(52) U.S. Cl.
CPC .............. *G01V 1/008* (2013.01); *G01V 1/284* (2013.01)

(58) Field of Classification Search
CPC ................................ G01V 1/008; G01V 1/284
See application file for complete search history.

(56) References Cited

FOREIGN PATENT DOCUMENTS

| CN | 109946742 | A | * | 6/2019 | | |
|----|-----------|---|---|--------|---|---|
| CN | 110687601 | A | * | 1/2020 | ............. | G01V 1/282 |
| CN | 111158047 | A | | 5/2020 | | |
| CN | 111999770 | A | * | 11/2020 | | |
| CN | 111999770 | A | | 11/2020 | | |
| CN | 112764105 | A | * | 5/2021 | ............... | G01V 1/30 |
| CN | 112764105 | B | * | 7/2022 | ............... | G01V 1/30 |
| CN | 115685337 | A | * | 2/2023 | | |
| CN | 111158047 | A | * | 9/2023 | ............... | G01V 1/28 |
| CN | 116755148 | A | * | 9/2023 | | |

OTHER PUBLICATIONS

Translation of CN 111999770. (Year: 2020).*
Translation of CN 111158047 (Year: 2020).*
Wenhao Lv et al.; "A new scheme of wavefield decomposed elastic least-squares reverse time migration", Frontiers in Earth Science, Sep. 7, 2022, 11 pages.

* cited by examiner

*Primary Examiner* — Daniel Pihulic
(74) *Attorney, Agent, or Firm* — Ruggiero McAllister & McMahon LLC

(57) ABSTRACT

This disclosure relates to the technical field of exploration geophysics, in particular to a method, a device, and a computer device for decoupling anisotropic elastic wave. The method includes: determining a set of Thomsen parameters included in an anisotropic model based on a received to-be-decomposed wave field decomposition request; transforming the set of Thomsen parameters to obtain a set of initial elastic parameters; performing S-wave and P-wave velocities separation processing for the set of initial elastic parameters to obtain a set of target P-wave elastic parameters and a set of target S-wave elastic parameters; and substituting those into the anisotropic model to process the to-be-decomposed wave field and obtain a target P-wave matrix and a target S-wave matrix. The process of decomposing S-wave and P-wave fields is simplified and the calculation cost is reduced according to the embodiments of this disclosure.

15 Claims, 10 Drawing Sheets

METHOD, DEVICE AND COMPUTER DEVICE FOR DECOUPLING ANISOTROPIC ELASTIC WAVE

CROSS-REFERENCE TO RELATED APPLICATIONS

This application claims priority to Chinese Patent Application No. 202211301926.5, filed on Oct. 24, 2022, which is hereby incorporated by reference in its entirety.

TECHNICAL FIELD

This disclosure relates to the technical field of exploration geophysics, in particular to a method, a device, and a computer device for decoupling anisotropic elastic wave.

BACKGROUND

With the development of computer technology and the increasing complexity of oil exploration targets, the requirements for the accuracy of seismic data processing become increasingly high, as a result, a demand for imaging techniques with multi-component elastic reverse time migration (ERTM) is increasing. The core technology of the ERTM is wave field separation of the elastic wave. In isotropic medium, wave field decomposition method of the elastic wave include: a Helmholtz decomposition, a traveling wave separation method, a decoupling prolongement equation, or the like. However, since a polarization direction of wave fields is not completely parallel or perpendicular to a propagation direction thereof in the anisotropic medium, an isotropic wave field separation method is not applicable.

In the anisotropic medium, a current mainstream wave field separation method is a wave field separation method with a wavenumber domain. In the wave field separation method with the wavenumber domain, firstly a polarization direction in the wavenumber domain is calculated, a wave field is projected to the polarization direction of the wave field in the wavenumber domain, and then the separated wave field is obtained by inverse Fourier transform. Therefore, the wave field separation method with the wavenumber domain requires a large number of Fourier transforms, resulting in a huge amount of calculation.

In the process of wave field separation in the anisotropic medium, how to avoid the inverse Fourier transform, how to simplify the P-wave (Primary wave) and S-wave (Secondary wave) field decomposition process, and how to reduce the calculation cost are problems that need to be urgently solved in the prior art.

SUMMARY

To solve the problems in the prior art, the embodiments of this disclosure provides a method, a device, a computer device, and a storage medium for decoupling anisotropic elastic wave, which is applied in a seismic wave field. The method includes: transforming a set of Thomsen parameters included in an anisotropic model to determine a set of initial elastic parameters; performing S-wave and P-wave velocities separation processing for the initial elastic parameters to obtain a set of target P-wave elastic parameters and a set of target S-wave elastic parameters for separating the S-wave and P-wave fields from the to-be-decomposed wave fields. The process of decomposing the S-wave and P-wave fields is simplified and the calculation cost is reduced.

In order to solve the technical problems, technical solutions of this disclosure are specifically set forth as follows: on the one hand, the embodiment of the disclosure provides an anisotropic elastic wave decoupling method applied to a seismic wave field, including:
determining a set of Thomsen parameters included in an anisotropic model based on a received to-be-decomposed wave field decomposition request, and the to-be-decomposed wave field decomposition request including a to-be-decomposed wave field;
transforming the set of Thomsen parameters to obtain a set of initial elastic parameters;
performing S-wave and P-wave velocities separation processing for the set of initial elastic parameters to obtain a set of target P-wave elastic parameters and a set of target S-wave elastic parameters; and
substituting the set of target P-wave elastic parameters and the set of target S-wave elastic parameters into the anisotropic model to process the to-be-decomposed wave field and obtain a target P-wave matrix and a target S-wave matrix.

Further, the set of initial elastic parameters includes:

$C_{11} = (1+2\varepsilon)\rho v_{p0}^2$ $C_{12} = (1+2\varepsilon)\rho v_{p0}^2 - 2(1+2\gamma)\rho v_{s0}^2$ $C_{13} = \rho\sqrt{[(1+2\delta)v_{p0}^2 - v_{s0}^2](v_{p0}^2 - v_{s0}^2)} - \rho v_{s0}^2$ $C_{33} = \rho v_{p0}^2$ $C_{44} = C_{55} = \rho v_{s0}^2$ $C_{66} = (1+2\gamma)\rho v_{s0}^2$ where, the $C_{11}$, the $C_{12}$, the $C_{13}$, the $C_{33}$, the $C_{44}$, the $C_{55}$ and the $C_{66}$ are initial elastic parameters, respectively, the $\varepsilon$, the $\gamma$ and the $\delta$ are parameters of anisotropy, respectively, the $v_{p0}$ is a P-wave velocity of a medium along a symmetry axis direction, the $v_{s0}$ is a S-wave velocity of the medium along the symmetry axis direction, and the $\rho$ is a medium density field.

Further, the step of performing S-wave and P-wave velocities separation processing for the set of initial elastic parameters to obtain a set of target P-wave elastic parameters and a set of target S-wave elastic parameters further includes:
determining, from the set of initial elastic parameters, at least one to-be-separated elastic parameter, wherein the to-be-separated elastic parameter includes the initial elastic parameters determined based on the S-wave and P-wave velocities;
determining a corresponding step of separating S-wave and P-wave velocities for each of the at least one to-be-separated elastic parameter, and
performing the S-wave and P-wave velocities separation processing for each of the to-be-separated elastic parameters based on the step of separating the S-wave and P-wave velocities to obtain the set of target P-wave elastic parameters and the set of target S-wave elastic parameters.

Further, in a case where the to-be-separated elastic parameters are processed based on a square root operation, the step of separating the S-wave and P-wave velocities further includes:
performing square root processing on the to-be-separated elastic parameters to obtain the separated elastic parameters; and performing the S-wave and P-wave velocities separation processing for the separated elastic parameters to obtain target P-wave elastic parameters and target S-wave elastic parameters for the acquisition of the set of target P-wave elastic parameters and the set of target S-wave elastic parameters.

Further, the set of target P-wave elastic parameters includes:

$$C_{11}^p = (1 + 2\varepsilon)\rho v_{p0}^2$$

$$C_{12}^p = (1 + 2\varepsilon)\rho v_{p0}^2$$

$$C_{13}^p = \rho v_{p0}^2 \sqrt{1 + 2\delta \frac{v_{p0}^2}{v_{p0}^2 - v_{s0}^2}}$$

$$C_{33}^p = \rho v_{p0}^2$$

$$C_{44}^p = C_{55}^p = 0$$

$$C_{66}^p = 0$$

where, the $C_{11}^p$, the $C_{12}^p$, the $C_{13}^p$, the $C_{33}^p$, the $C_{44}^p$, the $C_{55}^p$ and the $C_{66}^p$ are target P-wave elastic parameters, respectively, the $\varepsilon$ and the $\delta$ are parameters of anisotropy, respectively, the $v_{p0}$ is the P-wave velocity of the medium along the symmetry axis direction, the $v_{s0}$ is the S-wave velocity of the medium along the symmetry axis direction, and the $\rho$ is the medium density field.

Further, the set of target S-wave elastic parameters includes:

$$C_{11}^s = 0$$

$$C_{12}^s = -2(1 + 2\gamma)\rho v_{s0}^2$$

$$C_{13}^s = -\rho v_{s0}^2 \left(1 + \sqrt{1 + 2\delta \frac{v_{p0}^2}{v_{p0}^2 - v_{s0}^2}}\right)$$

$$C_{33}^s = 0$$

$$C_{44}^s = C_{55}^S = \rho v_{s0}^2$$

$$C_{66}^s = (1 + 2\gamma)\rho v_{s0}^2$$

where, the $C_{11}^s$, the $C_{12}^s$, the $C_{13}^s$, the $C_{33}^s$, the $C_{44}^s$, the $C_{55}^s$ and the $C_{66}^s$ are target S-wave elastic parameters, respectively, the $\gamma$ and the $\delta$ are parameters of anisotropy, respectively, the $v_{p0}$ is the P-wave velocity of the medium along the symmetry axis direction, the $v_{s0}$ is the S-wave velocity of the medium along the symmetry axis direction, and the $\rho$ is the medium density field.

Further, the step of substituting the set of target P-wave elastic parameters and the set of target S-wave elastic parameters into the anisotropic model to process the to-be-decomposed wave field and obtain a target P-wave matrix and a target S-wave matrix includes:

substituting the set of target P-wave elastic parameters and the set of target S-wave elastic parameters into the anisotropic model to obtain a target anisotropic equation; and solving the target anisotropic equation set using a staggered grid high-order finite-difference method to obtain the target P-wave matrix and the target S-wave matrix.

On the other hand, this disclosure further provides in the embodiments an anisotropic elastic wave decoupling device applied to a seismic wave field, including:

a first determination unit configured to determine a set of Thomsen parameters included in an anisotropic model based on a received to-be-decomposed wave field decomposition request, and the to-be-decomposed wave field decomposition request includes a to-be-decomposed wave field;

a transformation unit configured to transform the set of Thomsen parameters to obtain a set of initial elastic parameters;

a separation unit configured to perform S-wave and P-wave velocities separation processing for the set of initial elastic parameters to obtain a set of target P-wave elastic parameters and a set of target S-wave elastic parameters; and a processing unit configured to substitute the set of target P-wave elastic parameters and the set of target S-wave elastic parameters into the anisotropic model to process the to-be-decomposed wave field and obtain a target P-wave matrix and a target S-wave matrix.

On the other hand, this disclosure further provides in the embodiments a computer equipment including: a memory, a processor and a computer program stored in the memory and executable on the processor, and the method is implemented when the processor executes the computer program.

On the other hand, this disclosure further provides in the embodiments a computer readable storage medium, and the computer readable storage medium stores computer instructions, and the method is implemented when the computer instructions are executed by a processor.

In the embodiments of this disclosure, the set of Thomsen parameters included in the anisotropic model is determined when the to-be-decomposed wave field decomposition request is received, thus the set of Thomsen parameters is transformed to determine the set of initial elastic parameters; the S-wave and P-wave velocities separation processing is performed for the set of initial elastic parameters to obtain the set of target P-wave elastic parameters and the set of target S-wave elastic parameters; and the target P-wave matrix and the target S-wave matrix are determined based on the set of target P-wave elastic parameters, the set of target S-wave elastic parameters and the anisotropic model. Therefore, in the process of separating the wave fields in the anisotropic medium, the inverse Fourier transform is avoided, the process of decomposing the S-wave and P-wave fields is simplified and the calculation cost is reduced.

BRIEF DESCRIPTION OF THE DRAWINGS

In order to more clearly illustrate the technical solutions in the prior art or the embodiments of this disclosure, drawings used in the description in embodiments or the prior art will be simply introduced below. Obviously, the drawings in the description below are only some embodiments of this disclosure, and other drawings may also be obtained by those skilled in the art based on these drawings without making creative efforts.

DETAILED DESCRIPTION

The technical solution in the embodiments of this disclosure will be illustrated clearly and integrally in combination with the drawings in the embodiments of this disclosure, and obviously, the described embodiments are merely part of the embodiments, not all of the embodiments of this disclosure. Based on the embodiments of this disclosure, all other embodiments may be obtained by persons skilled in the art without making creative efforts falls within the protection scope of this disclosure.

It should be noted that the terms "first", "second" in the specification and claims and the drawings of this disclosure are used to distinguish similar objects and are not necessarily used to describe a specific order or sequence. It should be understood that the data used in this way may be interchanged under appropriate circumstances, so that the embodiments illustrated herein may be implemented in sequences other than those illustrated or described herein. In addition, the terms "including" and "comprising" and any variations thereof are intended to cover non-exclusive inclusions, for example, a process, a method, a device, a product, or an equipment that includes a series of steps or units do not be limited to those steps or units clearly listed, but may include other steps or units that are not clearly listed or inherent to this process, method, product, or equipment.

It should be noted that the steps shown in the flowchart of the drawings may be executed in a computer system including a set of computer-executable instructions, and, although a logical sequence is shown in the flowchart, in some cases, the shown or described steps may be performed in an order different from that herein.

Figure 1:
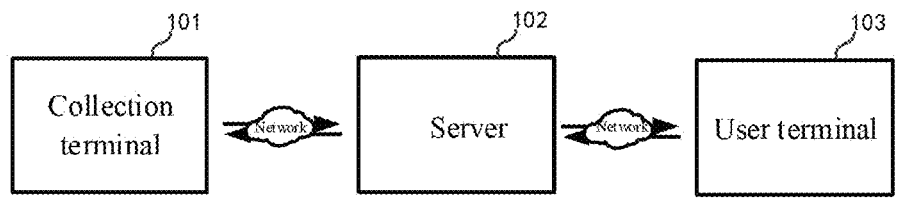
FIG. 1 is an implementation system schematic diagram of an anisotropic elastic wave decoupling method according to an embodiment of this disclosure.

FIG. 1 is an implementation system schematic diagram of an anisotropic elastic wave decoupling method according to an embodiment of this disclosure. A collection terminal 101 and a server 102 may be included. The collection terminal 101 and the server 102 communicate with each other through a network. The network may include a Local Area Network (LAN), a Wide Area Network (WAN), the Internet, or a combination thereof, and is connected to a website, a user equipment (such as a computing device), and a back-end system. A to-be-decomposed wave field can be input to the server 102 through the collection terminal 101. The collection terminal 101 may be, for example, an electronic device or a sensor. The to-be-decomposed wave field may be obtained from a signal collected by a sensor or input by a user through an electronic device. After receiving the to-be-decomposed wave field, the server 102 transforms an acquired set of Thomsen parameters included in an anisotropic model and performs S-wave and P-wave velocities separation to obtain a set of target P-wave elastic parameters and a set of target S-wave elastic parameters, and thus the set of target P-wave elastic parameters, the set of target S-wave elastic parameters and the anisotropic model are used to determine a target P-wave matrix and a target S-wave matrix for generating a decomposed longitudinal and S-wave image.

If the collection terminal 101 is an electronic device, the decomposed longitudinal and S-wave image corresponding to the to-be-decomposed wave field may be transmitted to the electronic device. In a case where the collection terminal 101 is a sensor, an implementation system schematic diagram of an anisotropic elastic wave decoupling method may also include a user terminal 103, the decomposed longitudinal and S-wave image may be transmitted to the user terminal 103. The user terminal 103 and the server 102 communicate with each other through a network. The network may include a Local Area Network (LAN), a Wide Area Network (WAN), the Internet, or a combination thereof, and is connected to a website, a user equipment (such as a computing device), and a back-end system.

Optionally, the server 102 may be a node of a cloud computing system (not shown in the FIG), or each of the servers 102 may be a separate cloud computing system all of which consist of a plurality of computers interconnected by a network and operating as a distributed processing system.

In an optional embodiment, the user terminal 103 may include an electronic device. The electronic device included in the user terminal 103 and the electronic device that the collection terminal 101 may be are not limited to a smart phone, a collection device, a desktop computer, a tablet computer, a notebook computer, a smart speaker, a digital assistant, an augmented reality (AR)/virtual reality (VR), an intelligent wearable device, or the like. Optionally, an operating system running on the electronic device may include but is not limited to Android system, IOS system, Linux, Windows, or the like.

It should also be noted that FIG. 1 only illustrates an application environment provided by this disclosure. In an actual application, a plurality of collection terminals 101 and a plurality of user terminals 103 may also be included, which is not limited by this disclosure.

Figure 2:
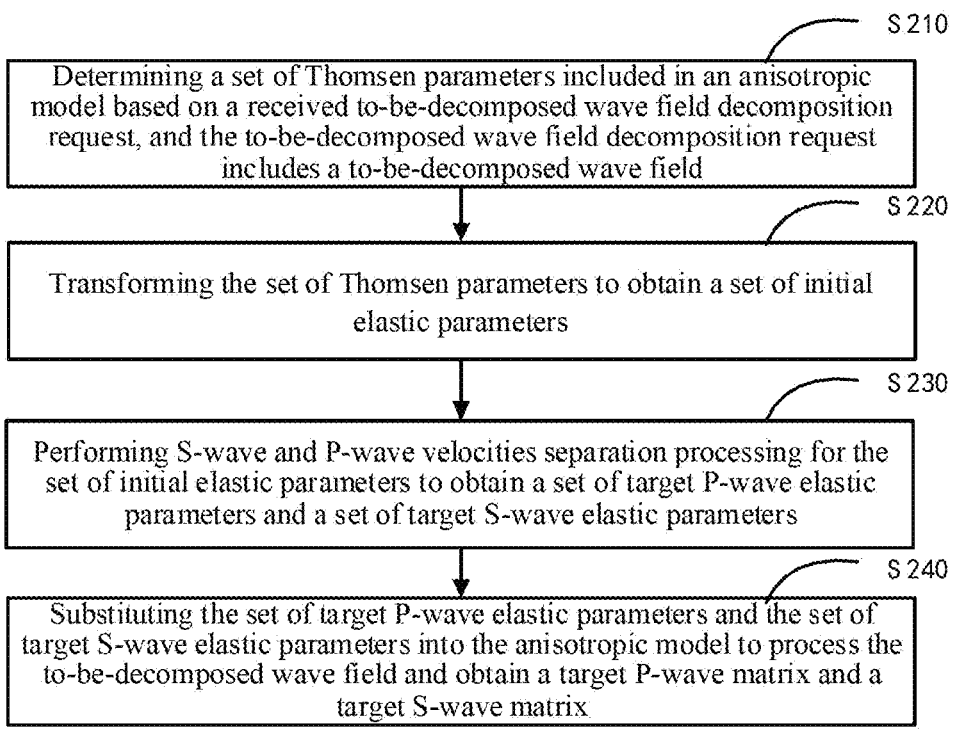
FIG. 2 is a flow diagram of an anisotropic elastic wave decoupling method according to an embodiment of this disclosure.

FIG. 2 is a flow diagram of an anisotropic elastic wave decoupling method according to an embodiment of this disclosure, in which a process for decoupling a seismic wave field is depicted, however, more or less operational steps may be included based on conventional or non-creative efforts. The sequence of steps listed in the embodiments is only one of a plurality of sequences in which steps are performed and does not represent a unique execution sequence. When the system or device product is executed in practice, the methods shown in the embodiments or drawings may be executed sequentially or in parallel. Specifically, as shown in FIG. 2, the method may include:

S210, determining a set of Thomsen parameters included in an anisotropic model based on a received to-be-decomposed wave field decomposition request, and the to-be-decomposed wave field decomposition request includes a to-be-decomposed wave field;

S220, transforming the set of Thomsen parameters to obtain a set of initial elastic parameters;

S230, performing S-wave and P-wave velocities separation processing for the set of initial elastic parameters to obtain a set of target P-wave elastic parameters and a set of target S-wave elastic parameters; and S240, substituting the set of target P-wave elastic parameters and the set of target S-wave elastic parameters into the anisotropic model to process the to-be-decomposed wave field and obtain a target P-wave matrix and a target S-wave matrix.

The set of Thomsen parameters included in the anisotropic model is determined when the to-be-decomposed wave field decomposition request is received, thus the set of Thomsen parameters is transformed to determine the set of initial elastic parameters; the S-wave and P-wave velocities separation processing is performed for the set of initial elastic parameters to obtain the set of target P-wave elastic parameters and the set of target S-wave elastic parameters; and the target P-wave matrix and the target S-wave matrix are determined based on the set of target P-wave elastic parameters, the set of target S-wave elastic parameters and the anisotropic model. Therefore, in the process of separating the wave fields in the anisotropic medium, the inverse Fourier transform is avoided, the process of decomposing the S-wave and P-wave fields is simplified and the calculation cost is reduced.

According to an embodiment of this disclosure, an anisotropic model is any model configured to digitize the to-be-decomposed wave field in the anisotropic medium and determine the corresponding S-wave matrix and P-wave matrix. For example, the anisotropic model includes a first-order velocity stress equation and an equation-solving algorithm. The equation-solving algorithm is used to solve the first-order velocity stress equation obtained based on the to-be-decomposed wave field, so as to obtain the corresponding S-wave matrix and P-wave matrix. The first-order velocity stress equation includes longitudinal and S-wave velocities and a set of Thomsen parameters (Thomsen parameter field).

The set of Thomsen parameters is transformed to obtain a set of initial elastic parameters. Specifically, a plurality of Thomsen parameters included in the set of Thomsen parameters is transformed respectively to determine the initial elastic parameters corresponding to each Thomsen parameter based on a mapping relationship between each Thomsen parameter in the set of Thomsen parameters as shown in Formula (1) below and the initial elastic parameters, so as to obtain the set of initial elastic parameters.

$$\begin{cases} \alpha_0 = \sqrt{\dfrac{C_{33}}{\rho}} \\ \beta_0 = \sqrt{\dfrac{C_{44}}{\rho}} \\ \varepsilon = \dfrac{C_{11} - C_{33}}{2C_{33}} \\ \delta = \dfrac{(C_{13} + C_{44})^2 - (C_{33} - C_{44})^2}{2C_{33}(C_{33} - C_{44})} \\ \gamma = \dfrac{C_{66} - C_{44}}{2C_{44}} \end{cases} \quad \text{Formula (1)}$$

where, $\alpha_0$, $\beta_0$ are vertical velocities of a P-wave (quasi P wave) and a S-wave (quasi S wave) in a vertical direction, $v_{p0} = \alpha_0$, $v_{s0} = \beta_0$, $\varepsilon$, $\delta$ and $\gamma$ are parameters of anisotropy, respectively, which are dimensionless Thomsen parameters, $\varepsilon$ is a parameter that describes a strength of P-wave anisotropy, when $\varepsilon$ is 0, P-waves are not anisotropic; $\delta$ describes a relationship between a P-wave vertical velocity $v_{p0}$ and a normal moveout velocity $v_{pe}$, that is, $\delta$ is a physical quantity that affects the P-wave velocity near the symmetry axis of the anisotropic medium, $\gamma$ is a parameter that describes an anisotropy strength of a S-wave or a splitting degree of the S-wave in the propagation process of the S-wave. $C_{11}$, $C_{12}$, $C_{13}$, $C_{33}$, $C_{44}$, $C_{55}$ and $C_{66}$ are the initial elastic parameters, respectively.

As can be seen from the Formula (1), the resulting initial elastic parameters are functions of the S-wave velocity and the P-wave velocity after a plurality of Thomsen parameters included in the set of Thomsen parameters are transformed, respectively.

For a plurality of initial elastic parameters included in the set of initial elastic parameters, the S-wave velocity and the P-wave velocity included in the initial elastic parameters are separated to obtain the corresponding target P-wave elastic parameters and target S-wave elastic parameters. For example, if the initial elastic parameters are a sum of the function of the S-wave velocity and the function of the P-wave velocity, the resulting target P-wave elastic parameter is the function of the P-wave velocity, and the target S-wave elastic parameter is the function of the S-wave velocity after the S-wave and P-wave velocities are separated for the initial elastic parameters. That is, the plurality of P-wave elastic parameters included in the generated set of target P-wave elastic parameters are functions of the P-wave velocity, and the plurality of S-wave elastic parameters included in the set of target S-wave elastic parameters are functions of the S-wave velocity.

After the set of target P-wave elastic parameters and the set of target S-wave elastic parameters are determined, the set of P-wave elastic parameters and the set of target S-wave elastic parameters are substituted into the first-order velocity stress equation included in the anisotropic model to obtain the target anisotropic equation set, thus the equation-solving algorithm is used to solve the target anisotropic equation set to obtain the target P-wave matrix and the target S-wave matrix, the data in the target P-wave matrix and the target S-wave matrix are functions of time, respectively, so as to obtain decomposed longitudinal and S-wave images. It should be noted that the image is image corresponding to the parameter field, also called a wave field snapshot.

According to another embodiment of this disclosure, as can be seen from the Formula (1), after the plurality of Thomsen parameters included in the set of Thomsen parameters are transformed, the resulting set of initial elastic parameters includes, for example, Formulas (2) to (7) below.

$$C_{11}=(1+2\varepsilon)\rho v_{p0}^2 \qquad \text{Formula (2)}$$

$$C_{12}=(1+2\varepsilon)\rho v_{p0}^2-2(1+2\gamma)\rho v_{s0}^2 \qquad \text{Formula (3)}$$

$$C_{13}=\rho\sqrt{[(1+2\delta)v_{p0}^2-v_{s0}^2](v_{p0}^2-v_{s0}^2)}-\rho v_{s0}^2 \qquad \text{Formula (4)}$$

$$C_{33}=\rho v_{p0}^2 \qquad \text{Formula (5)}$$

$$C_{44}=C_{55}=\rho v_{s0}^2 \qquad \text{Formula (6)}$$

$$C_{66}=(1+2\gamma)\rho v_{s0}^2 \qquad \text{Formula (7)}$$

where, the $C_{11}$, the $C_{12}$, the $C_{13}$, the $C_{33}$, the $C_{44}$, the $C_{55}$ and the $C_{66}$ are initial elastic parameters, respectively, the $\varepsilon$, the $\gamma$ and the $\delta$ are parameters of anisotropy, respectively, the $v_{p0}$ is a P-wave velocity of a medium along a symmetry axis, the $v_{s0}$ is a S-wave velocity of the medium along the symmetry axis, and the $\rho$ is a medium density field.

Figure 3:
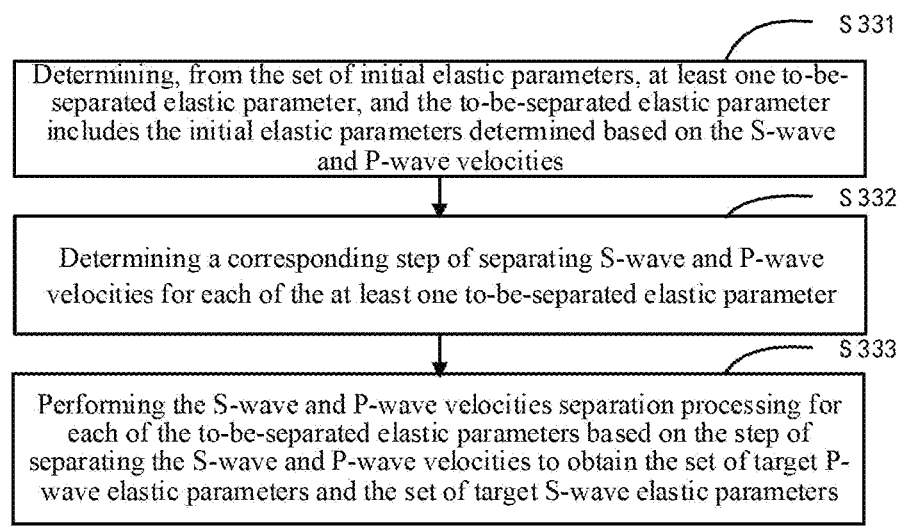
FIG. 3 is a flow diagram of an anisotropic elastic wave decoupling method according to another embodiment of this disclosure.

FIG. 3 is a flow diagram of an anisotropic elastic wave decoupling method according to another embodiment of this disclosure, which describes a process of the anisotropic elastic wave decoupling method. However, more or less operational steps may be included based on common or non-creative efforts. Specifically, as shown in FIG. 3, the method may include:

S331, determining, from the set of initial elastic parameters, at least one to-be-separated elastic parameter, and the to-be-separated elastic parameter includes the initial elastic parameters determined based on the S-wave and P-wave velocities;

S332, determining a corresponding step of separating S-wave and P-wave velocities for each of the at least one to-be-separated elastic parameter, and S333, performing the S-wave and P-wave velocities separation processing for each of the to-be-separated elastic parameters based on the step of separating the S-wave and P-wave velocities to obtain the set of target P-wave elastic parameters and the set of target S-wave elastic parameters.

In the embodiments of this disclosure, the step of separating the S-wave and P-wave velocities corresponding to each of the to-be-separated elastic parameters is determined for the at least one to-be-separated elastic parameter determined from the set of initial elastic parameters. Then, the step of separating the S-wave and P-wave velocities is performed to separate the S-wave and P-wave velocities on the corresponding to-be-separated elastic parameters, and thus the set of target P-wave elastic parameters and the set of target S-wave elastic parameters are obtained. The separation of S-wave and P-wave velocities for each of the initial elastic parameters included in the set of initial elastic parameters is realized, and then the S-wave and P-wave fields are separated in the to-be-decomposed wave field. Images corresponding to the S-wave and P-wave fields obtained in the embodiments of this disclosure are subjected to less S-wave and P-wave interference than the separated S-wave and P-wave fields obtained without separating the S-wave and P-wave velocities.

According to another embodiment of this disclosure, the to-be-separated elastic parameter is the initial elastic parameter corresponding to the function consisting of the S-wave velocity and the P-wave velocity. For example, the to-be-separated elastic parameter may be the initial elastic parameter $C_{12}$ or $C_{13}$ included in the Formula (3) or the Formula (4), respectively.

Whether or not both the S-wave velocity and the P-wave velocity are included is identified respectively, for each initial elastic parameter in the set of initial elastic parameters. In a case where a target initial elastic parameter is determined to be a function consisting of the S-wave velocity and the P-wave velocity, the target initial elastic parameter is the to-be-separated elastic parameter.

The corresponding step of separating the S-wave and P-wave velocities is determined for each of at least one to-be-separated elastic parameter, based on a multi-wave velocity composition type corresponding to the to-be-separated elastic parameters. This multi-wave velocity composition type is a way in which the S-wave velocity and the P-wave velocity together to form the function, such as, addition, multiplication and division. The corresponding step of separating the S-wave and P-wave velocities may be pre-configured for each type. For example, for the addition type, as shown in the Formula (3), the step of separating the S-wave and P-wave velocities may involve directly sorting the S-wave and P-wave velocities, sorting the functions of the to-be-separated elastic parameters into a function of the S-wave velocity and a function of the P-wave velocity. So, the function of S-wave velocity is the target S-wave elastic parameter corresponding to the to-be-separated elastic parameter, and the function of P-wave velocity is the target P-wave parameter corresponding to the to-be-separated elastic parameter.

According to another embodiment of this disclosure, in a case where the to-be-separated elastic parameters are determined based on a square root operation, e.g., the step of separating the S-wave and P-wave velocities can include: performing square root processing on the to-be-separated elastic parameters to obtain the separated elastic parameters; and performing the S-wave and P-wave velocities separation processing for the separated elastic parameters to obtain target P-wave elastic parameters and target S-wave elastic parameters for the acquisition of the set of target P-wave elastic parameters and the set of target S-wave elastic parameters.

For example, the to-be-separated elastic parameters determined based on the square root operation are as shown in the Formula (4).

According to another embodiment of this disclosure, based on the step of separating the S-wave and P-wave velocities, each to-be-separated elastic parameter is subjected to the separation of the S-wave and P-wave velocities. The determined set of target P-wave elastic parameters may include Formula (8) to Formula (13) below.

$$C_{11}^p = (1+2\varepsilon)\rho v_{p0}^2 \quad \text{Formula (8)}$$

$$C_{12}^p = (1+2\varepsilon)\rho v_{p0}^2 \quad \text{Formula (9)}$$

$$C_{13}^p = \rho v_{p0}^2 \sqrt{1 + 2\delta \frac{v_{p0}^2}{v_{p0}^2 - v_{s0}^2}} \quad \text{Formula (10)}$$

$$C_{33}^p = \rho v_{p0}^2 \quad \text{Formula (11)}$$

$$C_{44}^p = C_{55}^p = 0 \quad \text{Formula (12)}$$

$$C_{66}^p = 0 \quad \text{Formula (13)}$$

where, the $C_{11}^P$, the $C_{12}^P$, the $C_{13}^P$, the $C_{33}^P$, the $C_{44}^P$, the $C_{55}^P$ and the $C_{66}^P$ are target P-wave elastic parameters, respectively, the $\varepsilon$ and the $\delta$ are parameters of anisotropy, respectively, the $v_{p0}$ is the P-wave velocity of the medium along the symmetry axis, the $v_{s0}$ is the S-wave velocity of the medium along the symmetry axis, and the $\rho$ is the medium density field.

According to another embodiment of this disclosure, based on the step of separating the S-wave and P-wave velocities, each to-be-separated elastic parameter is subjected to the separation of the S-wave and P-wave velocities. The set of target S-wave elastic parameters may include Formula (14) to Formula (19).

$$C_{11}^s = 0 \quad \text{Formula (14)}$$

$$C_{12}^s = -2(1+2\gamma)\rho v_{s0}^2 \quad \text{Formula (15)}$$

$$C_{13}^s = -\rho v_{s0}^2 \left(1 + \sqrt{1 + 2\delta \frac{v_{p0}^2}{v_{p0}^2 - v_{s0}^2}}\right) \quad \text{Formula (16)}$$

$$C_{33}^s = 0 \quad \text{Formula (17)}$$

$$C_{44}^s = C_{55}^s = \rho v_{s0}^2 \quad \text{Formula (18)}$$

$$C_{66}^s = (1+2\gamma)\rho v_{s0}^2 \quad \text{Formula (19)}$$

where, the $C_{11}^s$, the $C_{12}^s$, the $C_{13}^s$, the $C_{33}^s$, the $C_{44}^s$, the $C_{55}^s$ and the $C_{66}^s$ are target S-wave elastic parameters, respectively, the $\gamma$ and the $\delta$ are parameters of anisotropy, respectively, the $v_{p0}$ is the P-wave velocity of the medium along the symmetry axis, the $v_{s0}$ is the S-wave velocity of the medium along the symmetry axis, and the $\rho$ is the medium density field.

As can be seen from the Formulas, for the to-be-separated elastic parameter $C_{12}$, the to-be-separated elastic parameter is of the summation type. The S-wave velocity and the P-wave velocity are sorted, the functions of the to-be-separated elastic parameters are sorted into the target P-wave elastic parameter $C_{12}^P$ and the target S-wave elastic parameter $C_{12}^s$. Similarly, for the to-be-separated elastic parameter $C_{13}$, the to-be-separated elastic parameter is of a square root type, and a square root processing is performed for the to-be-separated elastic parameter to obtain the separated elastic parameter. The S-wave and P-wave velocities are separated for the separated elastic parameters, and the target P-wave elastic parameter $C_{13}^P$ and the target S-wave elastic parameter $C_{13}^s$ are obtained.

Figure 4:
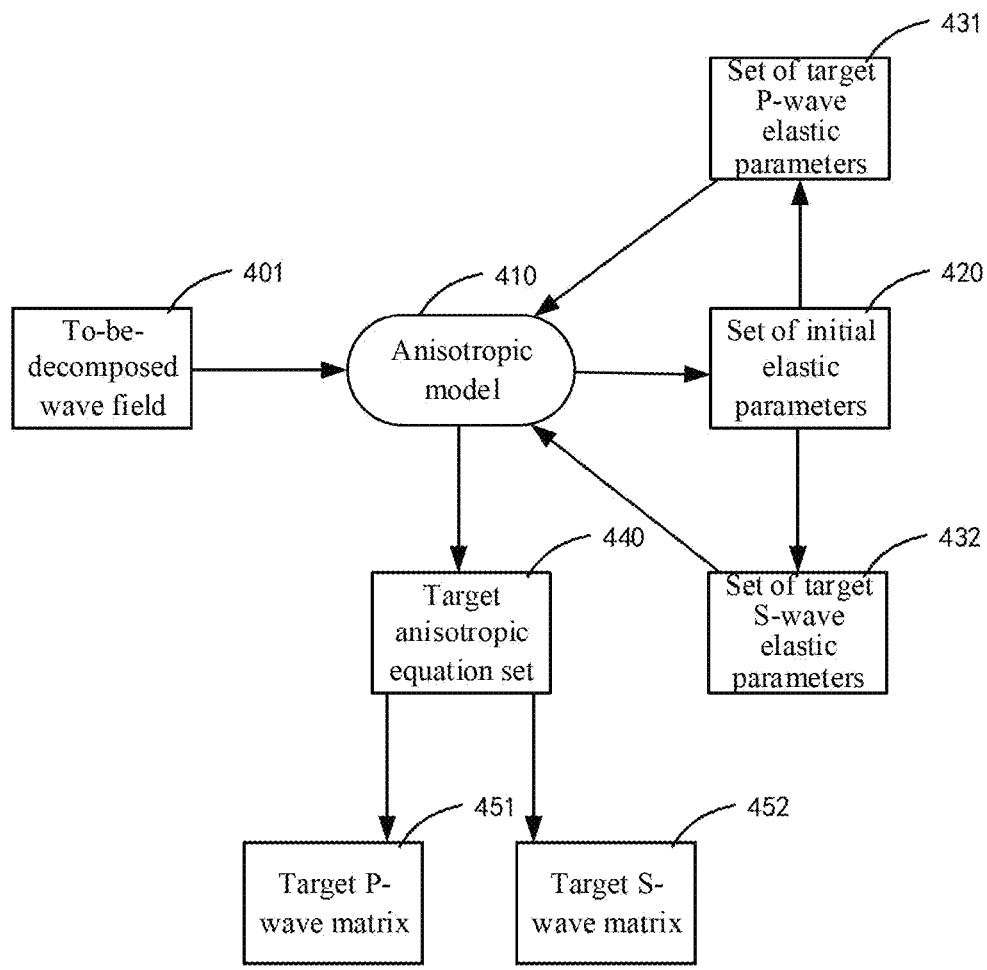
FIG. 4 is a schematic diagram of an anisotropic elastic wave decoupling method according to an embodiment of this disclosure.

FIG. 4 is a schematic diagram of an anisotropic elastic wave decoupling method according to an embodiment of this disclosure.

According to another embodiment of this disclosure, the step of substituting the set of target P-wave elastic parameters and the set of target S-wave elastic parameters into the anisotropic model to process the to-be-decomposed wave field and obtain a target P-wave matrix and a target S-wave matrix includes: substituting the set of target P-wave elastic parameters and the set of target S-wave elastic parameters into the anisotropic model to obtain a target anisotropic equation set; and solving the target anisotropic equation set using a staggered grid high-order finite-difference method to obtain the target P-wave matrix and the target S-wave matrix.

The anisotropic model may be, for example, a first-order velocity stress equation and an equation-solving algorithm. The equation-solving algorithm may be, for example, a staggered grid high-order finite-difference method.

It should be noted that a first-order velocity stress equation of anisotropic is shown in Formula (20) below.

$$\begin{cases} \dot{\tau} = CL^T v \\ \rho \dot{v} = L\tau \end{cases} \quad \text{Formula (20)}$$

where, $v = (v_x, v_y, v_z)^T$ is a particle vibration velocity component, $\tau = (\tau_{xx}, \tau_{yy}, \tau_{zz}, \tau_{yz}, \tau_{xz}, \tau_{xy})$ is a stress component, T is a matrix transpose operation, $\dot{v}$ is a first-order derivative of a particle vibration velocity $v = (v_x, v_y, v_z)^T$ over time, $\dot{\tau}$ is a first-order derivative of a stress $\tau = (\tau_{xx}, \tau_{yy}, \tau_{zz}, \tau_{yz}, \tau_{xy}, \tau_{xy})$ over time, $v_x$, $v_y$, and $v_z$ are components of velocity in x, y and z directions, $\tau_{xx}, \tau_{yy}$, and $\tau_{zz}$ are three normal stress components, $\tau_{yz}$, $\tau_{xz}$, and $\tau_{xy}$ are three shear stress components, $\rho$ is the medium density field, L is a partial derivative operator matrix, C is an elastic parameter matrix, and the partial derivative operator matrix and the elastic parameter matrix are $$L = \begin{bmatrix} \frac{\partial}{\partial x} & 0 & 0 & 0 & \frac{\partial}{\partial z} & \frac{\partial}{\partial y} \\ 0 & \frac{\partial}{\partial y} & 0 & \frac{\partial}{\partial z} & 0 & \frac{\partial}{\partial x} \\ 0 & 0 & \frac{\partial}{\partial z} & \frac{\partial}{\partial y} & \frac{\partial}{\partial x} & 0 \end{bmatrix} \quad C = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix},$$

respectively, where, $\partial/\partial x$, $\partial/\partial y$, and $\partial/\partial z$ are derivatives in the x, y, and z directions, the $C_{11}$, the $C_{12}$, the $C_{13}$, the $C_{33}$, the $C_{44}$, the $C_{55}$ and the $C_{66}$ are initial elastic parameters, respectively.

The resulting set of target P-wave elastic parameters only related to the P-wave velocity and the resulting set of target S-wave elastic parameters only related to the S-wave velocity are substituted into the first-order velocity stress equation to obtain the target anisotropic equation set. The target anisotropic equation set includes a P-wave field equation consisting of a P-wave stress and a P-wave particle vibration velocity, and a S-wave field equation consisting of a S-wave stress and a S-wave particle vibration velocity.

To be specific, for example, the P-wave field equation may be represented by Formula (21) below, and the S-wave field equation may be represented by Formula (22) below.

$$\begin{cases}
\dfrac{\partial v_x^p}{\partial t} = \dfrac{1}{\rho}\dfrac{\partial \tau_{xx}^p}{\partial x} \\
\dfrac{\partial v_y^p}{\partial t} = \dfrac{1}{\rho}\dfrac{\partial \tau_{yy}^p}{\partial y} \\
\dfrac{\partial v_z^p}{\partial t} = \dfrac{1}{\rho}\dfrac{\partial \tau_{zz}^p}{\partial z} \\
\dfrac{\partial \tau_{xx}^p}{\partial t} = \rho v_{p0}^2 \left[ (1+2\varepsilon)\dfrac{\partial v_x}{\partial x} + (1+2\varepsilon)\dfrac{\partial v_y}{\partial y} + \sqrt{1+2\delta\dfrac{v_{p0}^2}{v_{p0}^2 - v_{s0}^2}}\dfrac{\partial v_z}{\partial z} \right] \\
\dfrac{\partial \tau_{yy}^p}{\partial t} = \rho v_{p0}^2 \left[ (1+2\varepsilon)\dfrac{\partial v_x}{\partial x} + (1+2\varepsilon)\dfrac{\partial v_y}{\partial y} + \sqrt{1+2\delta\dfrac{v_{p0}^2}{v_{p0}^2 - v_{s0}^2}}\dfrac{\partial v_z}{\partial z} \right] \\
\dfrac{\partial \tau_{zz}^p}{\partial t} = \rho v_{p0}^2 \left[ \sqrt{1+2\delta\dfrac{v_{p0}^2}{v_{p0}^2 - v_{s0}^2}}\dfrac{\partial v_x}{\partial x} + \sqrt{1+2\delta\dfrac{v_{p0}^2}{v_{p0}^2 - v_{s0}^2}}\dfrac{\partial v_y}{\partial y} + \dfrac{\partial v_z}{\partial z} \right]
\end{cases}$$

Formula (21)

$$\begin{cases}
\rho\dfrac{\partial v_x^s}{\partial t} = \dfrac{\partial \tau_{xx}^s}{\partial x} + \dfrac{\partial \tau_{xy}^s}{\partial y} + \dfrac{\partial \tau_{xz}^s}{\partial z} \\
\rho\dfrac{\partial v_y^s}{\partial t} = \dfrac{\partial \tau_{xy}^s}{\partial x} + \dfrac{\partial \tau_{yy}^s}{\partial y} + \dfrac{\partial \tau_{yz}^s}{\partial z} \\
\rho\dfrac{\partial v_z^s}{\partial t} = \dfrac{\partial \tau_{xz}^s}{\partial x} + \dfrac{\partial \tau_{yz}^s}{\partial y} + \dfrac{\partial \tau_{zz}^s}{\partial z} \\
\dfrac{\partial \tau_{xx}^s}{\partial t} = -\rho v_{s0}^2 \left[ 2(1+2\gamma)\dfrac{\partial v_y}{\partial y} + \left(1 + \sqrt{1+2\delta\dfrac{v_{p0}^2}{v_{p0}^2 - v_{s0}^2}}\right)\dfrac{\partial v_z}{\partial z} \right] \\
\dfrac{\partial \tau_{yy}^s}{\partial t} = -\rho v_{s0}^2 \left[ 2(1+2\gamma)\dfrac{\partial v_x}{\partial x} + \left(1 + \sqrt{1+2\delta\dfrac{v_{p0}^2}{v_{p0}^2 - v_{s0}^2}}\right)\dfrac{\partial v_z}{\partial z} \right] \\
\dfrac{\partial \tau_{zz}^s}{\partial t} = -\rho v_{p0}^2 \left[ \left(1 + \sqrt{1+2\delta\dfrac{v_{p0}^2}{v_{p0}^2 - v_{s0}^2}}\right)\dfrac{\partial v_x}{\partial x} + \left(1 + \sqrt{1+2\delta\dfrac{v_{p0}^2}{v_{p0}^2 - v_{s0}^2}}\right)\dfrac{\partial v_y}{\partial y} \right] \\
\dfrac{\partial \tau_{yz}^s}{\partial t} = \rho v_{s0}^2 \left( \dfrac{\partial v_y}{\partial z} + \dfrac{\partial v_z}{\partial y} \right) \\
\dfrac{\partial \tau_{xz}^s}{\partial t} = \rho v_{s0}^2 \left( \dfrac{\partial v_x}{\partial z} + \dfrac{\partial v_z}{\partial x} \right) \\
\dfrac{\partial \tau_{xy}^s}{\partial t} = \rho v_{s0}^2 \left( (1+2\gamma)\dfrac{\partial v_x}{\partial z} + (1+2\gamma)\dfrac{\partial v_z}{\partial x} \right)
\end{cases}$$

Formula (22)

where, $\tau_{xx}^p$, $\tau_{yy}^p$, $\tau_{zz}^p$ are P-wave stress components, $\tau_{xx}^s$, $\tau_{yy}^s$, $\tau_{zz}^s$, $\tau_{yz}^s$, $\tau_{xz}^s$ and $\tau_{xy}^s$ are S-wave stress components, $v_x^p$, $v_y^p$ and $v_z^p$ are horizontal components and a vertical component of the P-wave particle vibration velocity; $v_x^s$, $v_y^s$ and $v_z^s$ are horizontal components and a vertical component of the S-wave particle vibration velocity; the $\varepsilon$, the $\gamma$ and the $\delta$ are parameters of anisotropy, respectively, the $v_{p0}$ is the P-wave velocity of the medium along the symmetry axis direction, the $v_{s0}$ is the S-wave velocity of the medium along the symmetry axis direction, the $\rho$ is the medium density field, and the x, y and z are three corresponding directions, respectively.

It should be noted that a total wave field is obtained by adding the P-wave field and the S-wave field. Specifically, the P-wave field equation is obtained by Formula (23) below.

$$\begin{cases} v = v^p + v^s \\ \tau = \tau^p + \tau^s \end{cases}$$

Formula (23)

where, $\tau = (\tau_{xx}, \tau_{yy}, \tau_{zz}, \tau_{yz}, \tau_{xz}, \tau_{xy})$ is a stress component, $v = (v_x, v_y, v_z)^T$ is a particle vibration velocity component, T is a matrix transpose operation, $v^p = (v_x^p, v_y^p, v_z^p)^T$ and $v^s = (v_x^s, v_y^s, v_z^s)^T$ are the particle vibration velocity component of the P-wave field and the particle vibration velocity component of the S-wave field, respectively; and $\tau^p = (\tau_{xx}^p, \tau_{yy}^p, \tau_{zz}^p)$ and $\tau^s = (\tau_{xx}^s, \tau_{yy}^s, \tau_{zz}^s, \tau_{yz}^s, \tau_{xz}^s, \tau_{xy}^s)$ are the stress components of the P-wave field and the stress components of the S-wave field, respectively.

Then the staggered grid high-order finite-difference method is adopted for solving the Formulas (21) and (22) to obtain the target P-wave matrix and the target S-wave matrix.

As shown in FIG. 4, when a to-be-decomposed wave field 401 is received, a corresponding anisotropic model 410 is determined and the set of Thomsen parameters included in the anisotropic model 410 is transformed as shown in the Formula (1) to obtain a set of initial elastic parameters 420 as shown in the Formulas (2) to (7).

The S-wave and P-wave velocities separation processing is performed for the set of initial elastic parameters 420 to obtain a set of target P-wave elastic parameters 431 as shown in the Formulas (8) to (13), and a set of target S-wave elastic parameters 432 as shown in the Formulas (14) to (19).

The set of target P-wave elastic parameters 431 and the set of target S-wave elastic parameters 432 are substituted into the anisotropic model 410 configured to process the to-be-decomposed wave field 401, and a target anisotropic equation set 440 as shown in the Formulas (21) and (22) is obtained.

The staggered grid high-order finite-difference method is adopted to solve the target anisotropic equation set 440, and a target P-wave matrix 451 and a target S-wave matrix 452, which may be used for imaging, are obtained.

Figure 5A:
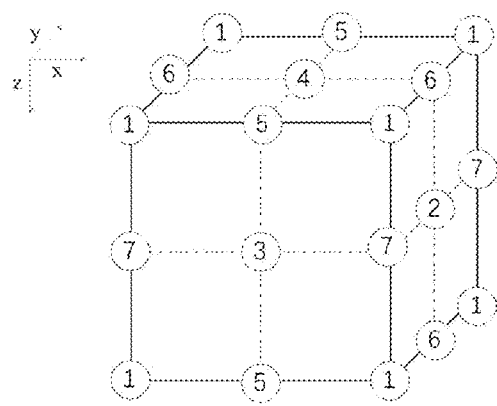
FIG. 5A is a grid schematic diagram of a staggered grid finite-difference scheme according to an embodiment of this disclosure.
Figure 5B:
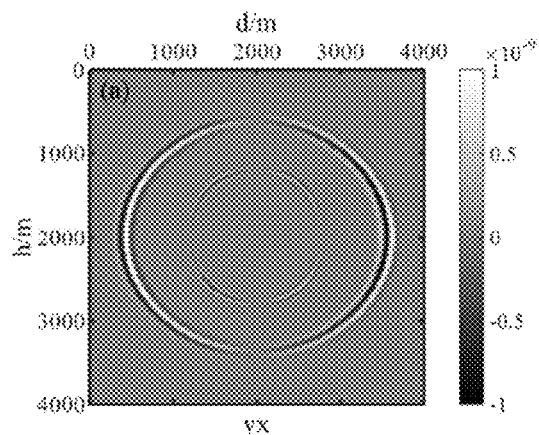
FIG. 5B is a schematic diagram of a wave field snapshot corresponding to a horizontal component of a particle vibration velocity field in full wave field according to an embodiment of this disclosure.
Figure 5C:
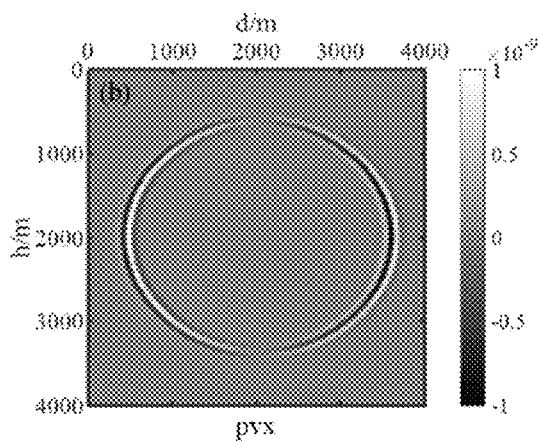
FIG. 5C is a schematic diagram of a wave field snapshot corresponding to a horizontal component of a P-wave particle vibration velocity field according to an embodiment of this disclosure.
Figure 5D:
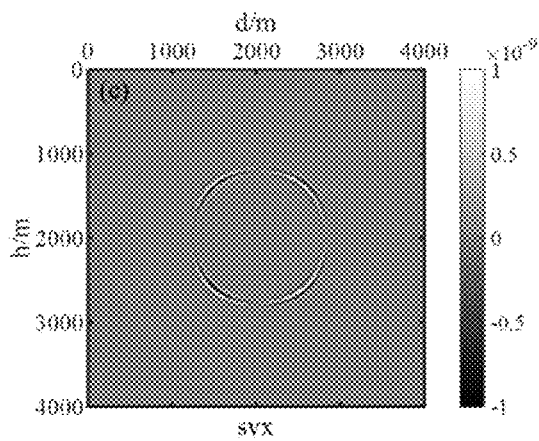
FIG. 5D is a schematic diagram of a wave field snapshot corresponding to a horizontal component of a S-wave particle vibration velocity field according to an embodiment of this disclosure.
Figure 5E:
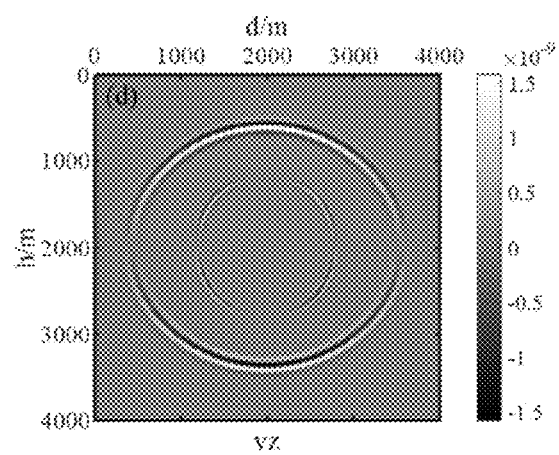
FIG. 5E is a schematic diagram of a wave field snapshot corresponding to a vertical component of a particle vibration velocity field in full wave field according to an embodiment of this disclosure.
Figure 5F:
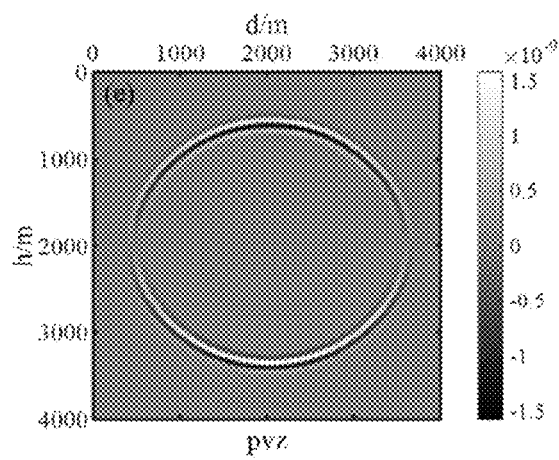
FIG. 5F is a schematic diagram of a wave field snapshot corresponding to a vertical component of a P-wave particle vibration velocity field according to an embodiment of this disclosure.
Figure 5G:
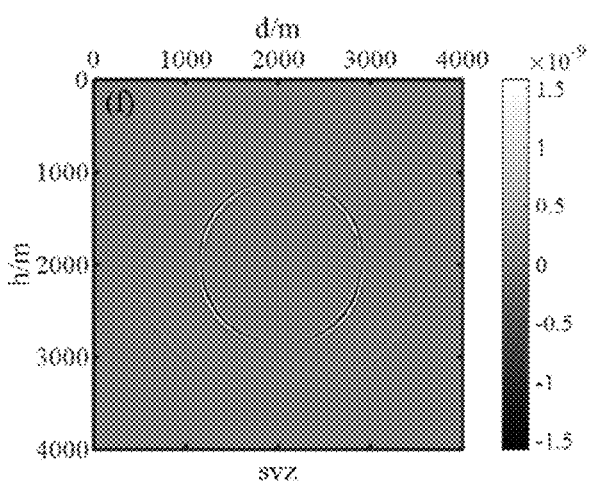
FIG. 5G is a schematic diagram of a wave field snapshot corresponding to a vertical component of a S-wave particle vibration velocity field according to an embodiment of this disclosure.
Figure 5H:
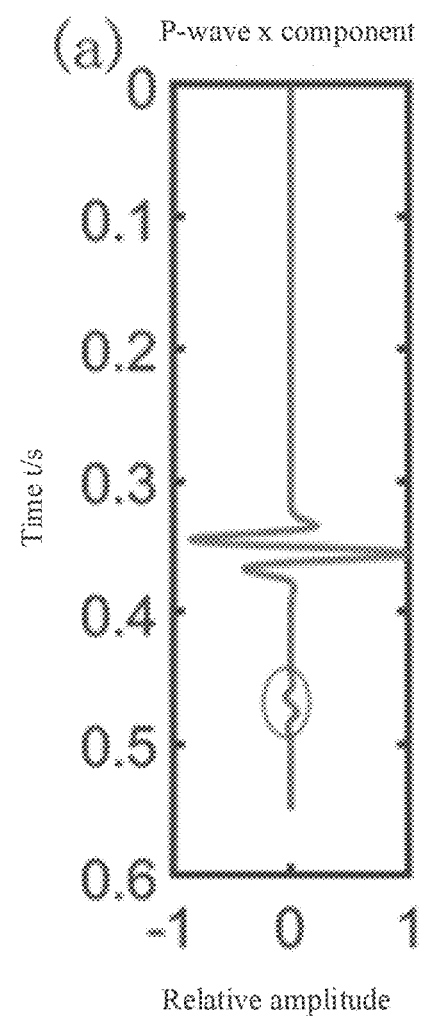
FIG. 5H is a schematic diagram of a single-channel waveform curve corresponding to a horizontal component of a P-wave particle vibration velocity field according to an embodiment of this disclosure.
Figure 5I:
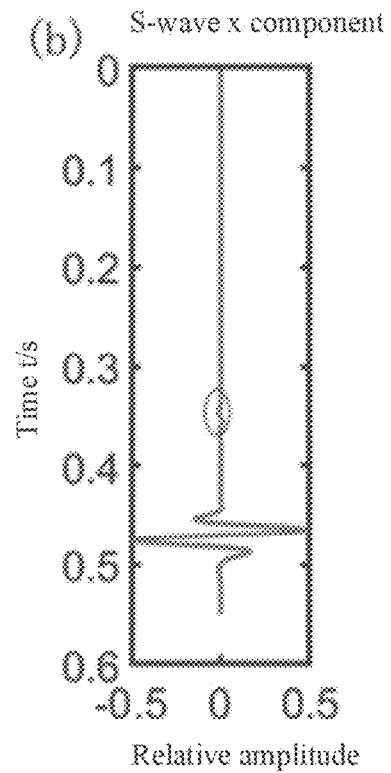
FIG. 5I is a schematic diagram of a single-channel waveform curve corresponding to a horizontal component of a S-wave particle vibration velocity field according to an embodiment of this disclosure.
Figure 5J:
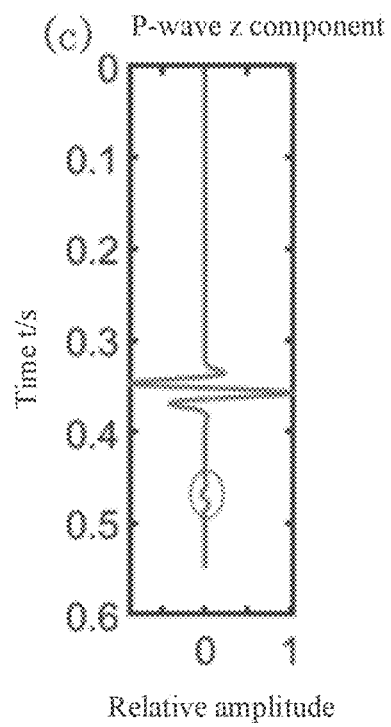
FIG. 5J is a schematic diagram of a single-channel waveform curve corresponding to a vertical component of a P-wave particle vibration velocity field according to an embodiment of this disclosure.
Figure 5K:
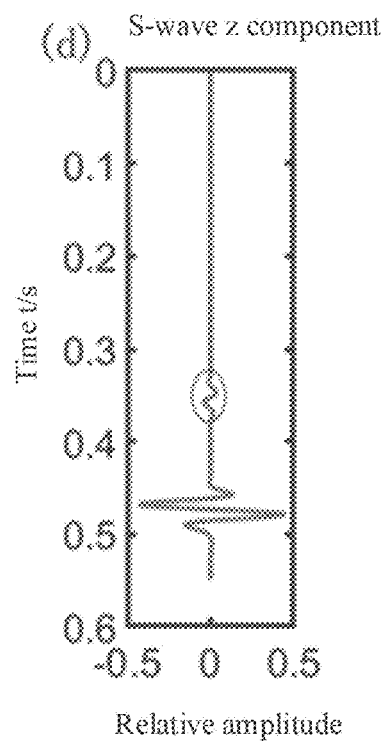
FIG. 5K is a schematic diagram of a single-channel waveform curve corresponding to a vertical component of a S-wave particle vibration velocity field according to an embodiment of this disclosure.
Figure 5L:
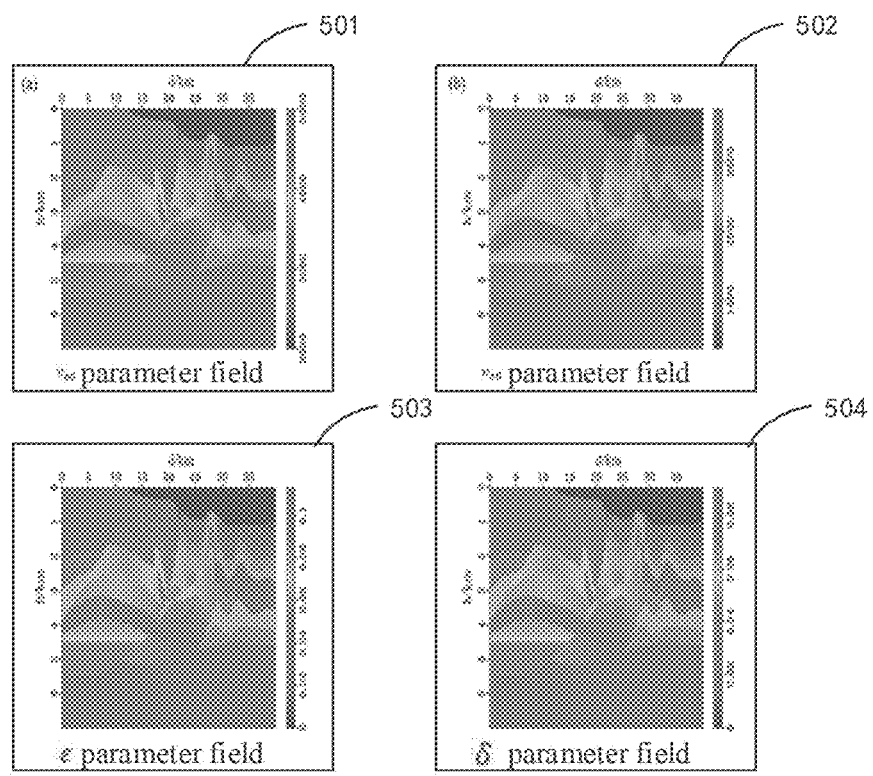
FIG. 5L is a schematic diagram of model parameters according to an embodiment of this disclosure.
Figure 5M:
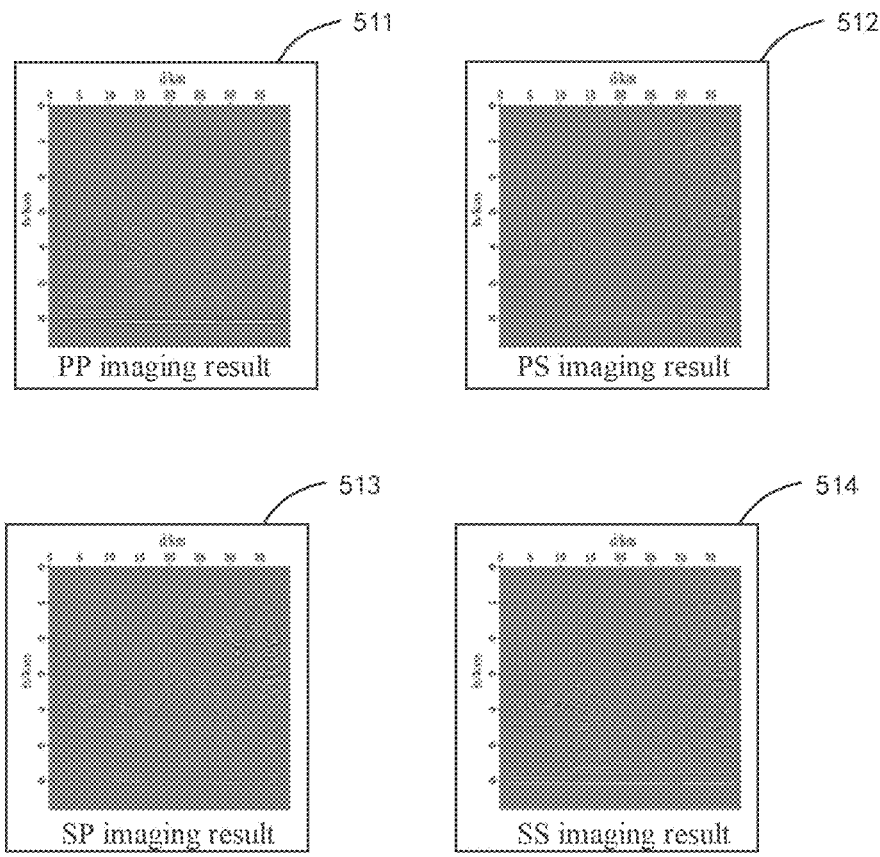
FIG. 5M is a schematic diagram of a reverse-time migration imaging result according to an embodiment of this disclosure.

FIG. 5A is a grid schematic diagram of a staggered grid finite-difference scheme according to an embodiment of this disclosure. FIG. 5B is a schematic diagram of a wave field snapshot corresponding to a horizontal component of a particle vibration velocity field in full wave field according to an embodiment of this disclosure. FIG. 5C is a schematic diagram of a wave field snapshot corresponding to a horizontal component of a P-wave particle vibration velocity field according to an embodiment of this disclosure. FIG. 5D is a schematic diagram of a wave field snapshot corresponding to a horizontal component of a S-wave particle vibration velocity field according to an embodiment of this disclosure. FIG. 5E is a schematic diagram of a wave field snapshot corresponding to a vertical component of particle vibration velocity field in full wave field according to an embodiment of this disclosure. FIG. 5F is a schematic diagram of a wave field snapshot corresponding to a vertical component of a P-wave particle vibration velocity field according to an embodiment of this disclosure. FIG. 5G is a schematic diagram of a wave field snapshot corresponding to a vertical component of a S-wave particle vibration velocity field according to an embodiment of this disclosure. FIG. 5H is a schematic diagram of a single-channel waveform curve corresponding to a horizontal component of a P-wave particle vibration velocity field according to an embodiment of this disclosure. FIG. 5I is a schematic diagram of a single-channel waveform curve corresponding to a horizontal component of a S-wave particle vibration velocity field according to an embodiment of this disclosure. FIG. 5J is a schematic diagram of a single-channel waveform curve corresponding to a vertical component of a P-wave particle vibration velocity field according to an embodiment of this disclosure. FIG. 5K is a schematic diagram of a single-channel waveform curve corresponding to a vertical component of a S-wave particle vibration velocity field according to an embodiment of this disclosure. FIG. 5L is a schematic diagram of model parameters according to an embodiment of this disclosure. FIG. 5M is a schematic diagram of a reverse-time migration imaging result according to an embodiment of this disclosure.

An anisotropic model is constructed based on a to-be-decomposed wave field when the to-be-decomposed wave field is received. The model includes a staggered grid finite-difference grid as shown in FIG. 5A. The anisotropic model has a size of 4000 m×4000 m, velocities of longitudinal and S-waves of 3,500 m/s and 2,000 m/s, respectively, a density of 1 g/cm$^3$, and anisotropic parameters such as $\varepsilon=0.15, \delta=0.1$. A numerical simulation is performed on a scheme of temporal second-order difference and spatial tenth-order difference of a staggered grid. And, a spatial sampling interval is 10 m both horizontally and vertically, a temporal sampling interval is 1 ms, a seismic source is an explosion one, a source wavelet is a 20 Hz Ricker wavelet, and the seismic source is located in the center of the model.

It should be noted that the grid of the staggered grid finite-difference as shown in FIG. 5A is specifically defined according to Formula (24) below.

$$\text{(1) } \tau_{xx\ i,j,k},\ \tau_{yy\ i,j,k},\ \tau_{zz\ i,j,k};$$
$$\text{(2) } \tau_{yz\ i,j+\frac{1}{2},k+\frac{1}{2}};$$
$$\text{(3) } \tau_{xz\ i+\frac{1}{2},j,k+\frac{1}{2}};$$
$$\text{(4) } \tau_{xy\ i+\frac{1}{2},j,k+\frac{1}{2}};$$
$$\text{(5) } v_{x\ i+\frac{1}{2},j,k};$$
$$\text{(6) } v_{y\ i,j\frac{1}{2},k};$$
$$\text{(7) } v_{z\ i,j,k+\frac{1}{2}}$$

Formula (24)

where, $\tau_{xx}$, $\tau_{yy}$, $\tau_{zz}$, $\tau_{yz}$, $\tau_{xz}$, and $\tau_{xy}$ are stress components, $v_x$, $v_y$, and $v_z$ are velocity components, i, j, and k are spatial lattice-point of the grid, and $$i+\frac{1}{2},\ j+\frac{1}{2},$$

and $$z+\frac{1}{2}$$

are spatial semi-point of the grid.

Based on the difference grid defined for FIG. 5A, the staggered grid high-order finite-difference grid is obtained as shown in Formula (25) below.

$$\tau^n_{xx\ i,j,k} = \tau^{n-1}_{xx\ i,j,k} + \frac{\Delta t}{\Delta x}C_{11}B_x v^{n+\frac{1}{2}}_{x\ i+\frac{1}{2},j,k} + \frac{\Delta t}{\Delta y}C_{12}B_y v^{n+\frac{1}{2}}_{y,i,j+\frac{1}{2},k} + \frac{\Delta t}{\Delta z}C_{13}B_z v^{n+\frac{1}{2}}_{z\ i,j,k+\frac{1}{2}}$$

$$\tau^n_{yy\ i,j,k} = \tau^{n-1}_{yy\ i,j,k} + \frac{\Delta t}{\Delta x}C_{12}B_x v^{n+\frac{1}{2}}_{x\ i+\frac{1}{2},j,k} + \frac{\Delta t}{\Delta y}C_{11}B_y v^{n+\frac{1}{2}}_{y\ i,j+\frac{1}{2},k} + \frac{\Delta t}{\Delta z}C_{13}B_z v^{n+\frac{1}{2}}_{z\ i,j,k+\frac{1}{2}}$$

$$T^n_{zz\ i,j,k} = \tau^{n-1}_{zz\ i,j,k} + \frac{\Delta t}{\Delta x}C_{13}B_x v^{n+\frac{1}{2}}_{x\ i+\frac{1}{2},j,k} + \frac{\Delta t}{\Delta y}C_{13}B_y v^{n+\frac{1}{2}}_{y\ i,j+\frac{1}{2},k} + + \frac{\Delta t}{\Delta z}C_{33}B_z v^{n+\frac{1}{2}}_{z\ i,j,k+\frac{1}{2}}$$

$$\tau^n_{yz\ i,j+\frac{1}{2},k+\frac{1}{2}} = \tau^{n-1}_{yz\ i,j+\frac{1}{2},k+\frac{1}{2}} + \frac{\Delta t}{\Delta z}C_{44}F_z v^{n+\frac{1}{2}}_{y\ i,j+\frac{1}{2},k} + \frac{\Delta t}{\Delta y}C_{44}F_y v^{n+\frac{1}{2}}_{z\ i,j,k+\frac{1}{2}}$$

$$\tau^n_{xz\ i+\frac{1}{2},j,k+\frac{1}{2}} = \tau^{n-1}_{xz\ i+\frac{1}{2},j,k+\frac{1}{2}} + \frac{\Delta t}{\Delta x}C_{44}F_x v^{n+\frac{1}{2}}_{z\ i,j,k+\frac{1}{2}} + \frac{\Delta t}{\Delta z}C_{44}F_z v^{n+\frac{1}{2}}_{x\ i+\frac{1}{2},j,k}$$

$$\tau^n_{xy\ i+\frac{1}{2},j+\frac{1}{2},k} = \tau^{n-1}_{xy\ i+\frac{1}{2},j,k+\frac{1}{2}} + \frac{\Delta t}{\Delta y}C_{66}F_y v^{n+\frac{1}{2}}_{x\ i+\frac{1}{2},j,k} + \frac{\Delta t}{\Delta x}C_{66}F_x v^{n+\frac{1}{2}}_{y\ i,j+\frac{1}{2},k}$$

$$v^{n+\frac{1}{2}}_{x\ i+\frac{1}{2},j,k} = v^{n-\frac{1}{2}}_{x\ i+\frac{1}{2},j,k} + \frac{\Delta t}{\Delta x\rho}F_x \tau^n_{xx\ i,j,k} + \frac{\Delta t}{\Delta y\rho}B_y \tau^n_{xy\ i+\frac{1}{2},j+\frac{1}{2},k} + \frac{\Delta t}{\Delta z\rho}B_z \tau^n_{yz\ i+\frac{1}{2},k+\frac{1}{2}}$$

Formula (25)

-continued $$v_{y\,i,j+\frac{1}{2},k}^{n+\frac{1}{2}} = v_{y\,i,j+\frac{1}{2},k}^{n-\frac{1}{2}} + \frac{\Delta t}{\Delta xp}B_x\tau_{xy\,i+\frac{1}{2},j+\frac{1}{2},k}^n + \frac{\Delta t}{\Delta y\rho}F_y\tau_{yy\,i,j,k}^n + \frac{\Delta t}{\Delta z\rho}B_z\tau_{yz\,i,j+\frac{1}{2},k+\frac{1}{2}}^n$$

$$v_{z,i,j,k+\frac{1}{2}}^{n+\frac{1}{2}} = v_{z\,i,j,k+\frac{1}{2}}^{n-\frac{1}{2}} + \frac{\Delta t}{\Delta x\rho}B_x\tau_{xz\,i+\frac{1}{2},j,k+\frac{1}{2}}^n + \frac{\Delta t}{\Delta y\rho}B_y\tau_{yz\,i,j+\frac{1}{2},k+\frac{1}{2}}^n + \frac{\Delta t}{\Delta z\rho}F_z\tau_{zz\,i,j,k}^n$$

where, $\tau_{xx}$, $\tau_{yy}$, $\tau_{zz}$, $\tau_{yz}$, $\tau_{xz}$, and $\tau_{xy}$ are stress components, $v_x$, $v_y$, and $v_z$ are velocity components, $\Delta t$ is a temporal sampling interval, n is a full-time point, $$n + \frac{1}{2}$$

and $$n - \frac{1}{2}$$

are half-time points, $\Delta x$, $\Delta y$, and $\Delta z$ are sampling intervals in x, y and z directions, $\rho$ is a medium density, $C_{11}$, $C_{12}$, $C_{13}$, $C_{33}$, $C_{44}$, $C_{55}$ and $C_{66}$ are initial elastic parameters, $F_x$, $F_y$, and $F_z$ are forward staggered grid difference schemes in the x, y and z directions, $B_x$, $B_y$, and $B_z$ are backward staggered grid difference coefficients in the x, y and z directions, to be specific, $$F_x U_{i,j,k} = \sum_{m=1}^{M} c_m^{(M)}[U_{i+m,j,k} - U_{i-m+1,j,k}]$$

$$F_y U_{i,j,k} = \sum_{m=1}^{M} c_m^{(M)}[U_{i,j+m,k} - U_{i,j-m+1,k}]$$

$$F_z U_{i,j,k} = \sum_{m=1}^{M} c_m^{(M)}[U_{i,j,k+m} - U_{i,j,k-m+1}]$$

$$B_x U_{i,j,k} = \sum_{m=1}^{M} c_m^{(M)}[U_{i+m-1,j,k} - U_{i-m,j,k}]$$

$$B_y U_{i,j,k} = \sum_{m=1}^{M} c_m^{(M)}[U_{i,j+m-1,k} - U_{i,j-m,k}]$$

$$B_z U_{i,j,k} = \sum_{m=1}^{M} c_m^{(M)}[U_{i,j,k+m-1} - U_{i,j,k-m}]$$

where, $c_m^{(M)}$ (m=1, 2, ..., M) is a 2M-order staggered grid difference coefficient, $U_{i,j,k}$ is a wave field value at a grid point (i,j,k), $U_{i+m,j,k}$, $U_{i,j+m,k}$ and $U_{i,j,k+m}$ are wave field values at grid points such as (i+m, j, k), (i, j+m, k) and (i, j, k+m), respectively, $\Delta_x$, $\Delta_y$, and $\Delta_z$ are sampling intervals in the x, y and z directions.

The method in the embodiments of this disclosure is adopted for processing the to-be-decomposed wave field obtained based on the source wavelet to separate the S-wave and P-wave fields, and a wave field snapshot corresponding to the particle vibration velocity field of the full wave field of 0.4 s is obtained. Specifically, the wave field snapshot corresponding to the particle vibration velocity field of the full wave field of 0.4 s includes a wave field snapshot corresponding to a horizontal component (VX) of the particle vibration velocity field in the full wave field as shown in FIG. 5B; a wave field snapshot corresponding to a horizontal component (PVX) of the P-wave particle vibration velocity field as shown in FIG. 5C; a wave field snapshot corresponding to a horizontal component (SVX) of the S-wave particle vibration velocity field as shown in FIG. 5D; a wave field snapshot corresponding to a vertical component (VZ) of the particle vibration velocity field in the full wave field as shown in FIG. 5E; a wave field snapshot corresponding to a vertical component (PVZ) of the P-wave particle vibration velocity field as shown in FIG. 5F; and a wave field snapshot corresponding to a vertical component (SVZ) of the S-wave particle vibration velocity field as shown in FIG. 5G. As can be seen from the wave field snapshots shown in FIGS. 5B-5G, although there is some crosstalk in the numerical simulation results obtained according to the embodiments of this disclosure, the amplitude of the residual term is weak, and the overall separation effect of the S-wave and P-wave fields is good.

In order to further verify the effectiveness of separating the S-wave and P-wave fields of the method according to the embodiments of this disclosure, the decomposed longitudinal and S-wave single-channel waveform results at the grid point (x=2400 m, y=2400 m) are extracted. Specifically, the single-channel waveform curve corresponding to the horizontal component of the P-wave particle vibration velocity field is as shown in FIG. 5H; the single-channel waveform curve corresponding to the horizontal component of the S-wave particle vibration velocity field is as shown in FIG. 5I; the single-channel waveform curve corresponding to the vertical component of the P-wave particle vibration velocity field is as shown in FIG. 5J; and the single-channel waveform curve corresponding to the vertical component of the S-wave particle vibration velocity field is as shown in FIG. 5K. The relative relationship between the residual amplitudes (the residual items are parts in the circle) may be intuitively seen from the single-channel waveform diagrams in FIGS. 5H to 5K. As to the x component, a maximum relative amplitude of residual S-waves in P-waves is 4.2%, and a maximum relative amplitude of residual P-waves in S-waves is 1.7%. As to the z component, the maximum relative amplitude of residual S-waves in P-waves and the maximum relative amplitude of residual P-waves in S-waves are 3.2% and 5.1%, respectively. Seen as such, the relative amplitude of the residual terms is generally small. Since superposition is performed in the process of reverse-time migration imaging, the interference of random noise may be effectively reduced. Therefore, the application of the method according to the embodiments of this disclosure to the reverse-time migration imaging may not produce an obvious imaging artifact.

Further, the anisotropic model (VTI-BGP model) provided by Bureau of Geophysical Prospecting (BGP) is used for imaging to verify the correctness of the embodiments of this disclosure. The model has a horizontal width of 40 km and a vertical depth of 6.7 km, a horizontal grid spacing of 25 m and a vertical grid spacing of 10 m. 800 detection points and shot points are evenly distributed on the model surface with an interval of 50 m. The Ricker wavelet with a main frequency of 20 Hz is selected as the source wavelet.

FIG. 5L shows the longitudinal and S-wave velocities and anisotropy parameters of the VTI-BGP model. Specifically, a P-wave velocity parameter field 501, a S-wave velocity parameter field 502, a ε parameter field 503 and a δ parameter field 504 are included.

Based on the separation of the S-wave and P-wave fields which is performed by the VTI-BGP model based on the set of target P-wave elastic parameters and the set of target S-wave elastic parameters obtained by the embodiments of this disclosure, four reverse time migration imaging results are obtained as shown in FIG. 5M. Specifically, a P-wave image of seismic source P-wave detection 511 (PP imaging result), a S-wave image of seismic source P-wave detection 512 (PS imaging result), a P-wave image of seismic source S-wave detection 513 (SP imaging result), and a S-wave image of seismic source S-wave detection 514 (SS imaging result) are included. As can be seen from the imaging results shown in FIG. 5M, the four imaging results may well indicate the structure of the model and consistent interface information, and there is no obvious imaging artifact.

Figure 6A:
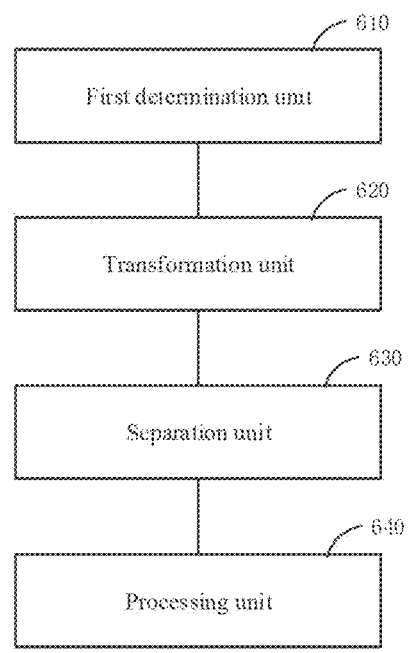
FIG. 6A is a structural schematic diagram of an anisotropic elastic wave decoupling device according to an embodiment of this disclosure.

FIG. 6A is a structural schematic diagram of an anisotropic elastic wave decoupling device according to an embodiment of this disclosure. As shown in FIG. 6A, the anisotropic elastic wave decoupling device includes:

a first determination unit 610 configured to determine a set of Thomsen parameters included in an anisotropic model based on a received to-be-decomposed wave field decomposition request, and the to-be-decomposed wave field decomposition request includes a to-be-decomposed wave field;

a transformation unit 620 configured to transform the set of Thomsen parameters to obtain a set of initial elastic parameters;

a separation unit 630 configured to perform S-wave and P-wave velocities separation processing for the set of initial elastic parameters to obtain a set of target P-wave elastic parameters and a set of target S-wave elastic parameters; and a processing unit 640 configured to substitute the set of target P-wave elastic parameters and the set of target S-wave elastic parameters into the anisotropic model to process the to-be-decomposed wave field and obtain a target P-wave matrix and a target S-wave matrix.

Since the principle in which the device solves the problem is similar to that of the method, references to the implementation of the method may be made for the implementation of the device, and the repeated details are not described any more.

Figure 6B:
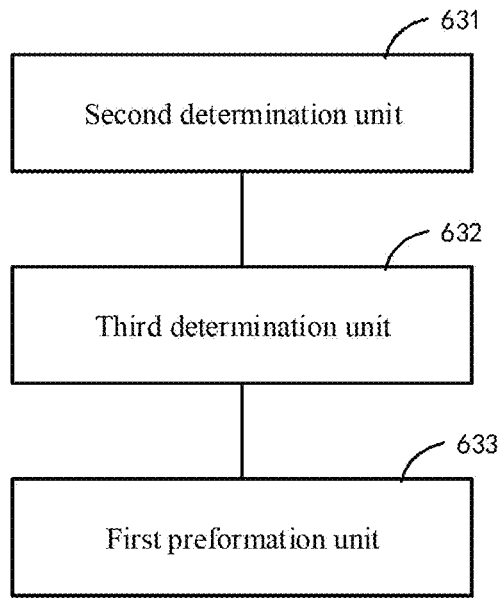
FIG. 6B is a structural schematic diagram of a separation unit according to an embodiment of this disclosure.

FIG. 6B is a structural schematic diagram of a separation unit according to an embodiment of this disclosure. As shown in FIG. 6B, the separation unit includes:

a second determination unit 631 configured to determine at least one to-be-separated elastic parameter from the set of initial elastic parameters, wherein the to-be-separated elastic parameter includes the initial elastic parameters determined based on the S-wave and P-wave velocities, a third determination unit 632 configured to determine a corresponding step of separating S-wave and P-wave velocities for each of the at least one to-be-separated elastic parameter, and a first preformation unit 633 configured to perform the S-wave and P-wave velocities separation processing for each of the to-be-separated elastic parameters based on the step of separating the S-wave and P-wave velocities to obtain the set of target P-wave elastic parameters and the set of target S-wave elastic parameters.

Since the principle in which the device solves the problem is similar to that of the method, references to the implementation of the method may be made for the implementation of the device, and the repeated details are not described any more.

Figure 6C:
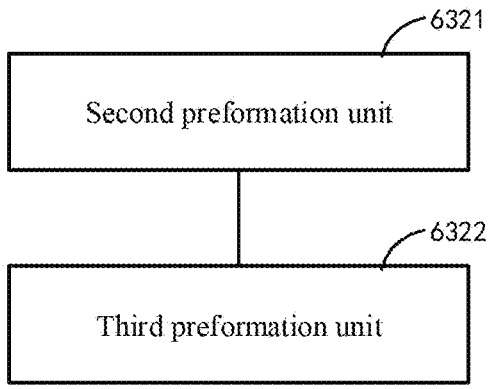
FIG. 6C is a structural schematic diagram of an anisotropic elastic wave decoupling device according to another embodiment of this disclosure.

FIG. 6C is a structural schematic diagram of an anisotropic elastic wave decoupling device according to another embodiment of this disclosure. As shown in FIG. 6C, in a case where the to-be-separated elastic parameters are determined based on a square root operation, the anisotropic elastic wave decoupling device further includes:

a second preformation unit 6321 configured to perform square root processing on the to-be-separated elastic parameters to obtain the separated elastic parameters; and a third preformation unit 6322 configured to perform the S-wave and P-wave velocities separation processing for the separated elastic parameters to obtain target P-wave elastic parameters and target S-wave elastic parameters for the acquisition of the set of target P-wave elastic parameters and the set of target S-wave elastic parameters.

Since the principle in which the device solves the problem is similar to that of the method, references to the implementation of the method may be made for the implementation of the device, and the repeated details are not described any more.

Figure 6D:
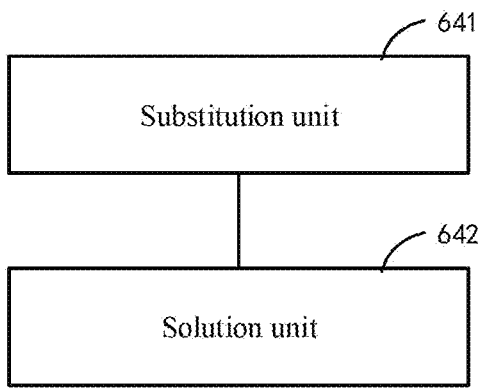
FIG. 6D is a structural schematic diagram of a processing unit according to an embodiment of this disclosure.

FIG. 6D is a structural schematic diagram of a processing unit according to an embodiment of this disclosure. As shown in FIG. 6D, the processing unit includes:

a substitution unit 641 configured to substitute the set of target P-wave elastic parameters and the set of target S-wave elastic parameters into the anisotropic model to obtain a target anisotropic equation set; and a solution unit 642 configured to solve the target anisotropic equation set using a staggered grid high-order finite-difference method to obtain the target P-wave matrix and the target S-wave matrix.

Since the principle in which the device solves the problem is similar to that of the method, references to the implementation of the method may be made for the implementation of the device, and the repeated details are not described any more.

Figure 7:
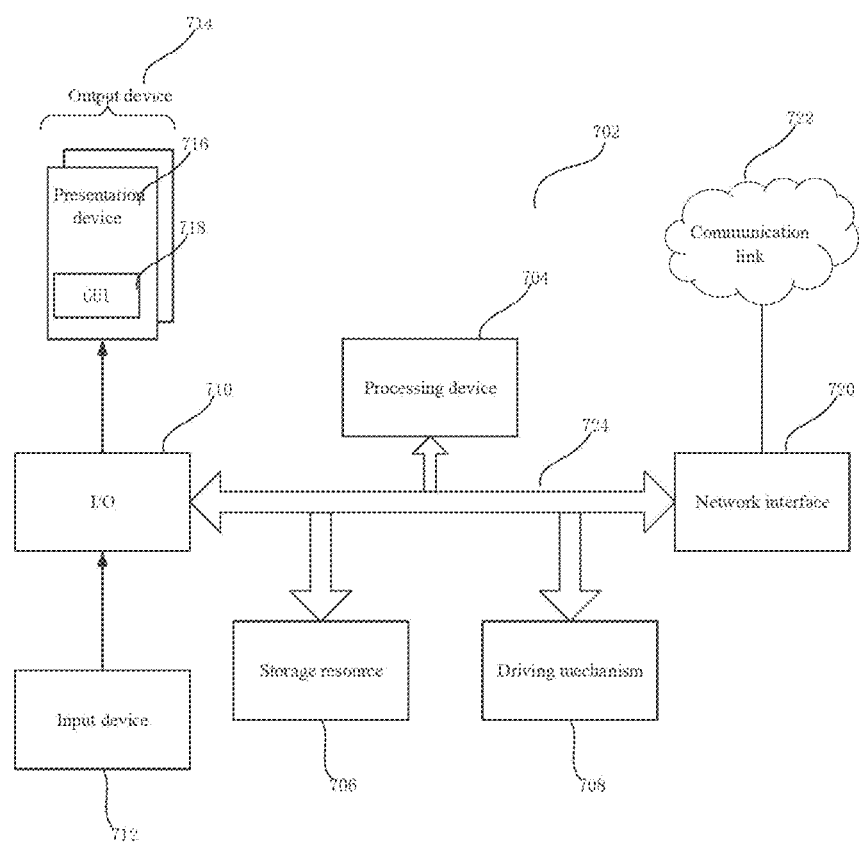
FIG. 7 is a structural schematic diagram of a computer device according to an embodiment of this disclosure.

FIG. 7 is a structural schematic diagram of a computer device according to an embodiment of this disclosure. The device in this disclosure may be a computer device in this embodiment to implement the method in this disclosure. A computer device 702 may include one or more processing devices 704, such as one or more central processing units (CPUs), each of which may implement one or more hardware threads. The computer device 702 may also include any storage resource 706 that is configured to store any type of information such as code, settings, data, or the like. Unrestrictedly, for example, a storage resource 706 may include any one or more combinations of: any type of RAM, any type of ROM, flash memory device, hard disk, optical disk, or the like. More generally, any storage resource may use any technology to store information. Further, any storage resource may provide volatile or non-volatile retention of information. Further, any storage resource may represent a fixed or removable member of the computer device 702. In one case, when a processing device 704 executes associated instructions stored in any or a combination of storage resources, the computer device 702 may execute any operation of the associated instructions. The computer device 702 also includes one or more drive mechanisms 708 for interacting with any storage resource, such as a hard disk drive, an optical disk drive, or the like.

The computer device 702 may also include an I/O module 710 (I/O) configured to receive various inputs (via an input device 712) and to provide various outputs (via an output device 714). One specific output mechanism may include a presentation device 716 and an associated graphical user interface (GUI) 718. In other embodiments, the I/O module 710 (I/O), the input device 712 and the output device 714 may not be included, and may only be used as a computer device in the network. The computer device 702 may also include one or more network interfaces 720 for exchanging data with other devices via one or more communication links 722. One or more communication buses 724 couple together the components described above.

The communication links 722 may be implemented in any manner, such as via a local area network, a wide area network (such as, the Internet), a point-to-point connection, or any combination thereof. The communications link 722 may include any combination of a hardwired link, a wireless link, a router, a gateway function, a name server governed by any or a combination of protocols.

An embodiment of this disclosure also provides a computer readable storage medium. The computer readable storage medium stores a computer program, and the method is implemented when the computer program is executed by a processor.

An embodiment of this disclosure also provides a computer program product. The computer program product includes a computer program, and the method is implemented when the computer program is executed by a processor.

Those skilled in the art appreciate that the embodiments of this disclosure may be provided as a method, a system, or a computer program product. Thus, this disclosure may take forms of embodiments in which hardware is involved alone, embodiments in which software is involved alone, or embodiments in which software is combined with hardware. This disclosure may take the form of a computer program product implemented on one or more computer-usable storage media (including, but not limited to, a disc memory, a CD-ROM, an optical memory, or the like) including a computer-usable program code therein.

This disclosure is described with reference to the flow diagram and/or block diagram of method, device (system), and computer program product according to the embodiments of this disclosure. It should be understood that each process and/or block in the flow diagram and/or block diagram, and a combination of processes and/or blocks in the flow diagram and/or block diagram, may be implemented by computer program instructions. These computer program instructions may be provided to a processor of a general-purpose computer, a special-purpose computer, an embedded processing device, or other programmable data processing device to produce a machine, so that instructions executed by a processor of a computer or other programmable data processing device produce a device for implementing the functions specified in one or more processes of the flow diagram and/or one or more blocks of the block diagram.

These computer program instructions may also be stored in a computer readable memory that causes a computer or other programmable data processing device to operate in a particular manner, so that the instructions stored in the computer readable memory produce an article of manufacture including an instruction device that is configured to implement the functions specified in one or more processes in the flow diagram and/or one or more blocks in the block diagram.

These computer program instructions may also be loaded onto a computer or other programmable data processing device, so as to execute a series of operational steps on a computer or other programmable device to implement a computer-implemented processing, such that instructions executed on the computer or other programmable device provide steps for implementing the functions specified in one or more processes in the flow diagram and/or one or more blocks in the block diagram.

The specific embodiments further illustrate the objective, technical solutions and advantageous effects of this disclosure in details. It should be understood that the objective, technical solutions and advantageous effects are only specific embodiments of this disclosure, and are not intended to limit the protection scope of this disclosure. Any amendment, equivalent replacement, improvement made within the spirit and principles of this disclosure shall be included in the protection scope of this disclosure.

What is claimed is:

1. An anisotropic elastic wave decoupling method applied to a seismic wave field, comprising:
   determining a set of Thomsen parameters included in an anisotropic model based on a received to-be-decomposed wave field decomposition request, wherein, the to-be-decomposed wave field decomposition request comprises a to-be-decomposed wave field;
   transforming the set of Thomsen parameters to obtain a set of initial elastic parameters;
   performing S-wave and P-wave velocities separation processing for the set of initial elastic parameters to obtain a set of target P-wave elastic parameters and a set of target S-wave elastic parameters; and
   substituting the set of target P-wave elastic parameters and the set of target S-wave elastic parameters into the anisotropic model to process the to-be-decomposed wave field and obtain a target P-wave matrix and a target S-wave matrix.

2. The method according to claim 1, wherein the set of initial elastic parameters comprises:

$$C_{11} = (1 + 2\varepsilon)\rho v_{p0}^2$$

$$C_{12} = (1 + 2\varepsilon)\rho v_{p0}^2 - 2(1 + 2\gamma)\rho v_{s0}^2$$

$$C_{13} = \rho\sqrt{\left[(1 + 2\delta)v_{p0}^2 - v_{s0}^2\right]\left(v_{p0}^2 - v_{s0}^2\right)} - \rho v_{s0}^2$$

$$C_{33} = \rho v_{p0}^2$$

$$C_{44} = C_{55} = \rho v_{s0}^2$$

$$C_{66} = (1 + 2\gamma)\rho v_{s0}^2$$

where, the $C_{11}$, the $C_{12}$, the $C_{13}$, the $C_{33}$, the $C_{44}$, the $C_{55}$ and the $C_{66}$ are initial elastic parameters, respectively, the $\varepsilon$, the $\gamma$ and the $\delta$ are parameters of anisotropy, respectively, the $v_{p0}$ is a P-wave velocity of a medium along a symmetry axis, the $v_{s0}$ is a S-wave velocity of the medium along the symmetry axis, and the $\rho$ is a medium density field.

3. The method according to claim 1, wherein the step of performing S-wave and P-wave velocities separation processing for the set of initial elastic parameters to obtain a set of target P-wave elastic parameters and a set of target S-wave elastic parameters comprises:
  determining, from the set of initial elastic parameters, at least one to-be-separated elastic parameter, wherein the to-be-separated elastic parameter comprises the initial elastic parameters determined based on the S-wave and P-wave velocities;
  determining a corresponding step of separating S-wave and P-wave velocities for each of the at least one to-be-separated elastic parameter, and
  performing the S-wave and P-wave velocities separation processing for each of the to-be-separated elastic parameters based on the step of separating the S-wave and P-wave velocities to obtain the set of target P-wave elastic parameters and the set of target S-wave elastic parameters.

4. The method according to claim 3, wherein in a case where the to-be-separated elastic parameters are determined based on a square root operation, the step of separating the S-wave and P-wave velocities comprises:
  performing square root processing on the to-be-separated elastic parameters to obtain the separated elastic parameters; and
  performing the S-wave and P-wave velocities separation processing for the separated elastic parameters to obtain target P-wave elastic parameters and target S-wave elastic parameters for the acquisition of the set of target P-wave elastic parameters and the set of target S-wave elastic parameters.

5. The method according to claim 1, wherein the set of target P-wave elastic parameters comprises:

$$C_{11}^p = (1+2\varepsilon)\rho v_{p0}^2$$

$$C_{12}^p = (1+2\varepsilon)\rho v_{p0}^2$$

$$C_{13}^p = -\rho v_{p0}^2 \sqrt{1+2\delta\frac{v_{p0}^2}{v_{p0}^2 - v_{s0}^2}}$$

$$C_{33}^p = \rho v_{p0}^2$$

$$C_{44}^p = C_{55}^p = 0$$

$$C_{66}^p = 0$$

where, the $C_{11}^p$, the $C_{12}^p$, the $C_{13}^p$, the $C_{33}^p$, the $C_{44}^p$, the $C_{55}^p$ and the $C_{66}^p$ are target P-wave elastic parameters, respectively, the $\varepsilon$ and the $\delta$ are parameters of anisotropy, respectively, the $v_{p0}$ is the P-wave velocity of the medium along the symmetry axis, the $v_{s0}$ is the S-wave velocity of the medium along the symmetry axis, and the $\rho$ is the medium density field.

6. The method according to claim 1, wherein the set of target S-wave elastic parameters comprises:

$$C_{11}^s = 0$$

$$C_{12}^s = -2(1+2\gamma)\rho v_{s0}^2$$

$$C_{13}^s = -\rho v_{s0}^2\left(1+\sqrt{1+2\delta\frac{v_{p0}^2}{v_{p0}^2 - v_{s0}^2}}\right)$$

$$C_{33}^s = 0$$

$$C_{44}^s = C_{55}^s = \rho v_{s0}^2$$

$$C_{66}^s = (1+2\gamma)\rho v_{s0}^2$$

where, the $C_{11}^s$, the $C_{12}^s$, the $C_{13}^s$, the $C_{33}^s$, the $C_{44}^s$, the $C_{55}^s$ and the $C_{66}^s$ are target S-wave elastic parameters, respectively, the $\gamma$ and the $\delta$ are parameters of anisotropy, respectively, the $v_{p0}$ is the P-wave velocity of the medium along the symmetry axis, the $v_{s0}$ is the S-wave velocity of the medium along the symmetry axis, and the $\rho$ is the medium density field.

7. The method according to claim 1, wherein the step of substituting the set of target P-wave elastic parameters and the set of target S-wave elastic parameters into the anisotropic model to process the to-be-decomposed wave field and obtain a target P-wave matrix and a target S-wave matrix comprises:
  substituting the set of target P-wave elastic parameters and the set of target S-wave elastic parameters into the anisotropic model to obtain a target anisotropic equation set; and
  solving the target anisotropic equation set using a staggered grid high-order finite-difference method to obtain the target P-wave matrix and the target S-wave matrix.

8. An anisotropic elastic wave decoupling device applied to a seismic wave field, comprising:
  a first determination unit configured to determine a set of Thomsen parameters included in an anisotropic model based on a received to-be-decomposed wave field decomposition request, wherein, the to-be-decomposed wave field decomposition request comprises a to-be-decomposed wave field;
  a transformation unit configured to transform the set of Thomsen parameters to obtain a set of initial elastic parameters;
  a separation unit configured to perform S-wave and P-wave velocities separation processing for the set of initial elastic parameters to obtain a set of target P-wave elastic parameters and a set of target S-wave elastic parameters; and
  a processing unit configured to substitute the set of target P-wave elastic parameters and the set of target S-wave elastic parameters into the anisotropic model to process the to-be-decomposed wave field and obtain a target P-wave matrix and a target S-wave matrix.

9. The device according to claim 8, wherein the separation unit further comprises:
  a second determination unit configured to determine at least one to-be-separated elastic parameter from the set of initial elastic parameters, wherein the to-be-separated elastic parameter comprises the initial elastic parameters determined based on the S-wave and P-wave velocities,
  a third determination unit configured to determine a corresponding step of separating S-wave and P-wave velocities for each of the at least one to-be-separated elastic parameter, and
  a first preformation unit configured to perform the S-wave and P-wave velocities separation processing for each of the to-be-separated elastic parameters based on the step of separating the S-wave and P-wave velocities to obtain the set of target P-wave elastic parameters and the set of target S-wave elastic parameters.

10. The device according to claim 9, wherein in a case where the to-be-separated elastic parameters are determined based on a square root operation, the anisotropic elastic wave decoupling device further comprises:

a second preformation unit configured to perform square root processing on the to-be-separated elastic parameters to obtain the separated elastic parameters; and a third preformation unit configured to perform the S-wave and P-wave velocities separation processing for the separated elastic parameters to obtain target P-wave elastic parameters and target S-wave elastic parameters for the acquisition of the set of target P-wave elastic parameters and the set of target S-wave elastic parameters.

11. The device according to claim 8, wherein the processing unit further comprises:

a substitution unit configured to substitute the set of target P-wave elastic parameters and the set of target S-wave elastic parameters into the anisotropic model to obtain a target anisotropic equation set; and a solution unit configured to solve the target anisotropic equation set using a staggered grid high-order finite-difference method to obtain the target P-wave matrix and the target S-wave matrix.

12. A computer device comprising: a memory, a processor and a computer program stored in the memory and executable on the processor, wherein an anisotropic elastic wave decoupling method is implemented when the processor executes the computer program, wherein the anisotropic elastic wave decoupling method comprises:

determining a set of Thomsen parameters included in an anisotropic model based on a received to-be-decomposed wave field decomposition request, wherein, the to-be-decomposed wave field decomposition request comprises a to-be-decomposed wave field;

transforming the set of Thomsen parameters to obtain a set of initial elastic parameters;

performing S-wave and P-wave velocities separation processing for the set of initial elastic parameters to obtain a set of target P-wave elastic parameters and a set of target S-wave elastic parameters; and substituting the set of target P-wave elastic parameters and the set of target S-wave elastic parameters into the anisotropic model to process the to-be-decomposed wave field and obtain a target P-wave matrix and a target S-wave matrix.

13. The computer device according to claim 12, wherein the step of performing S-wave and P-wave velocities separation processing for the set of initial elastic parameters to obtain a set of target P-wave elastic parameters and a set of target S-wave elastic parameters comprises:

determining, from the set of initial elastic parameters, at least one to-be-separated elastic parameter, wherein the to-be-separated elastic parameter comprises the initial elastic parameters determined based on the S-wave and P-wave velocities;

determining a corresponding step of separating S-wave and P-wave velocities for each of the at least one to-be-separated elastic parameter, and performing the S-wave and P-wave velocities separation processing for each of the to-be-separated elastic parameters based on the step of separating the S-wave and P-wave velocities to obtain the set of target P-wave elastic parameters and the set of target S-wave elastic parameters.

14. The computer device according to claim 13, wherein in a case where the to-be-separated elastic parameters are determined based on a square root operation, the step of separating the S-wave and P-wave velocities comprises:

performing square root processing on the to-be-separated elastic parameters to obtain the separated elastic parameters; and performing the S-wave and P-wave velocities separation processing for the separated elastic parameters to obtain target P-wave elastic parameters and target S-wave elastic parameters for the acquisition of the set of target P-wave elastic parameters and the set of target S-wave elastic parameters.

15. The computer device according to claim 12, wherein the step of substituting the set of target P-wave elastic parameters and the set of target S-wave elastic parameters into the anisotropic model to process the to-be-decomposed wave field and obtain a target P-wave matrix and a target S-wave matrix comprises:

substituting the set of target P-wave elastic parameters and the set of target S-wave elastic parameters into the anisotropic model to obtain a target anisotropic equation set; and solving the target anisotropic equation set using a staggered grid high-order finite-difference method to obtain the target P-wave matrix and the target S-wave matrix.

\* \* \* \* \*